(12) United States Patent
Fume et al.

(10) Patent No.: US 10,740,378 B2
(45) Date of Patent: Aug. 11, 2020

(54) METHOD FOR PRESENTING INFORMATION VOLUME FOR EACH ITEM IN DOCUMENT GROUP

(71) Applicant: KABUSHIKI KAISHA TOSHIBA, Tokyo (JP)

(72) Inventors: Kosei Fume, Kawasaki Kanagawa (JP); Tomohiro Yamasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 15/899,610

(22) Filed: Feb. 20, 2018

(65) Prior Publication Data

US 2019/0102453 A1 Apr. 4, 2019

(30) Foreign Application Priority Data

Oct. 2, 2017 (JP) ................................ 2017-192750

(51) Int. Cl.
*G06F 16/35* (2019.01)
*G06F 16/93* (2019.01)
*G06F 16/31* (2019.01)

(52) U.S. Cl.
CPC .......... *G06F 16/353* (2019.01); *G06F 16/322* (2019.01); *G06F 16/355* (2019.01); *G06F 16/358* (2019.01); *G06F 16/93* (2019.01)

(58) Field of Classification Search
CPC .... G06F 16/353; G06F 16/358; G06F 16/355; G06F 16/322; G06F 16/93
See application file for complete search history.

(56) References Cited

U.S. PATENT DOCUMENTS

| 8,745,086 | B2 | 6/2014 | Cardno et al. |
| 9,916,381 | B2 * | 3/2018 | Antonelli .............. G06F 16/353 |
| 2007/0112867 | A1 * | 5/2007 | Evans .................. G06F 16/355 |
| 2007/0185904 | A1 | 8/2007 | Matsuzawa et al. |
| 2012/0221553 | A1 | 8/2012 | Wittmer et al. |

(Continued)

FOREIGN PATENT DOCUMENTS

| JP | 11-296528 A | 10/1999 |
| JP | 2005-85166 | 3/2005 |

(Continued)

*Primary Examiner* — Albert M Phillips, III
(74) *Attorney, Agent, or Firm* — Finnegan, Henderson, Farabow, Garrett & Dunner, L.L.P.

(57) ABSTRACT

An information processing device according to an embodiment includes one or more processors. The processors perform hierarchical clustering of a key phrase group. The processors divide the key phrase group into candidate clusters. The processors receive a selectin operation of one item from predetermined items for classifying the document group. The processors calculate, for each candidate cluster, a score indicating utility with respect to the selected item. The processors decide, as a reference cluster, a candidate cluster for which the score has a predetermined ranking. The processors divide the reference cluster into sub-clusters. The processors extract predetermined sub-items in the lower levels of the selected item. And the processors control presentation of an expansion image for expressing the information volume of the documents for each sub-item and each sub-cluster.

13 Claims, 18 Drawing Sheets

(56) References Cited

U.S. PATENT DOCUMENTS

| | | | |
|---|---|---|---|
| 2014/0279757 A1* | 9/2014 | Shimanovsky | G06F 16/21 706/12 |
| 2017/0090916 A1 | 3/2017 | Nishikawa et al. | |
| 2018/0137435 A1 | 5/2018 | Okamoto et al. | |
| 2018/0253071 A1 | 9/2018 | Yamasaki et al. | |
| 2018/0260495 A1 | 9/2018 | Fujii et al. | |

FOREIGN PATENT DOCUMENTS

| | | |
|---|---|---|
| JP | 2017-68534 | 4/2017 |
| JP | 2014-510968 | 5/2017 |
| JP | 2018-81569 A | 5/2018 |
| JP | 2018-147091 A | 9/2018 |
| JP | 2018-147446 A | 9/2018 |

\* cited by examiner

FIG.15

ACTION    PHENOM-    TERM    OTHER
          ENON $$V(C_1) > V(C_2) > V(C_3) > V(C_4)$$

U.S. 10,740,378 B2

METHOD FOR PRESENTING INFORMATION VOLUME FOR EACH ITEM IN DOCUMENT GROUP

CROSS-REFERENCE TO RELATED APPLICATIONS

This application is based upon and claims the benefit of priority from Japanese Patent Application No. 2017-192750, filed on Oct. 2, 2017; the entire contents of which are incorporated herein by reference.

FIELD

Embodiments described herein relate generally to an information processing device, an information processing method, and a computer program product.

BACKGROUND

A document management system is known which documents used in a particular business assignment can be recorded in a database and can then be reused in another business assignment. Moreover, from a document group managed in the document management system, knowledge is extracted using data mining and text mining, and the extracted knowledge is put to use in analyzing and improving the business assignments.

Furthermore, as a way of searching for the intended documents from a document group managed in the document management system, a key phrase (word and a string of words) search and a facet search are known. In a facet search, a plurality of items and a hierarchical structure meant for classifying the documents are defined in advance; the user is made to sequentially select the items from the higher level to the lower level; and the documents are narrowed down.

Also regarding the manner of enabling the user to refer to the features of a document group managed in the document management system, various methods have been proposed. For example, as a method of enabling the user to refer to the features of a document group, the OLAP function (OLAP stands for Online Analytical Processing) is known. The OLAP function enables referring to the features of the entire document group in an overviewing manner as well as enables referring to the features of the document group while drilling down to the information indicating the details from among the information indicating the overall features. Alternatively, as a method of enabling the user to refer to the features of a document group, a heat map is also known. In a heat map, the features of the information classified from two different perspectives are expressed in a map having two axes.

Meanwhile, in a facet search, the structure of items needs to be defined in advance. However, for example, designing the structure of items and designing the corresponding database requires a substantially large cost. Moreover, in an advanced stage of operations of the document management system, even if there arises a need to search for documents and refer to the features of a document group from a new perspective, it is a difficult task to change the hierarchical structure of the already-defined items and to change the database structure.

On the other hand, a method is also known by which the items for classification are automatically generated using clustering. In this method, the structure of the items need not be designed in advance. However, in the method of automatically generating the items for classification using clustering, there is a significant restriction on the items that can be actually used. For example, in the method of automatically generating the items for classification using clustering, classification can be done into only such items, such as the quantity expression, discrete attributes such as colors and shapes, and the package names of source codes, which have their hierarchy information and their structure described in the documents.

BRIEF DESCRIPTION OF THE DRAWINGS

FIG. 15 is a diagram illustrating the score of each of a plurality of candidate clusters.

DETAILED DESCRIPTION

Figure 1:
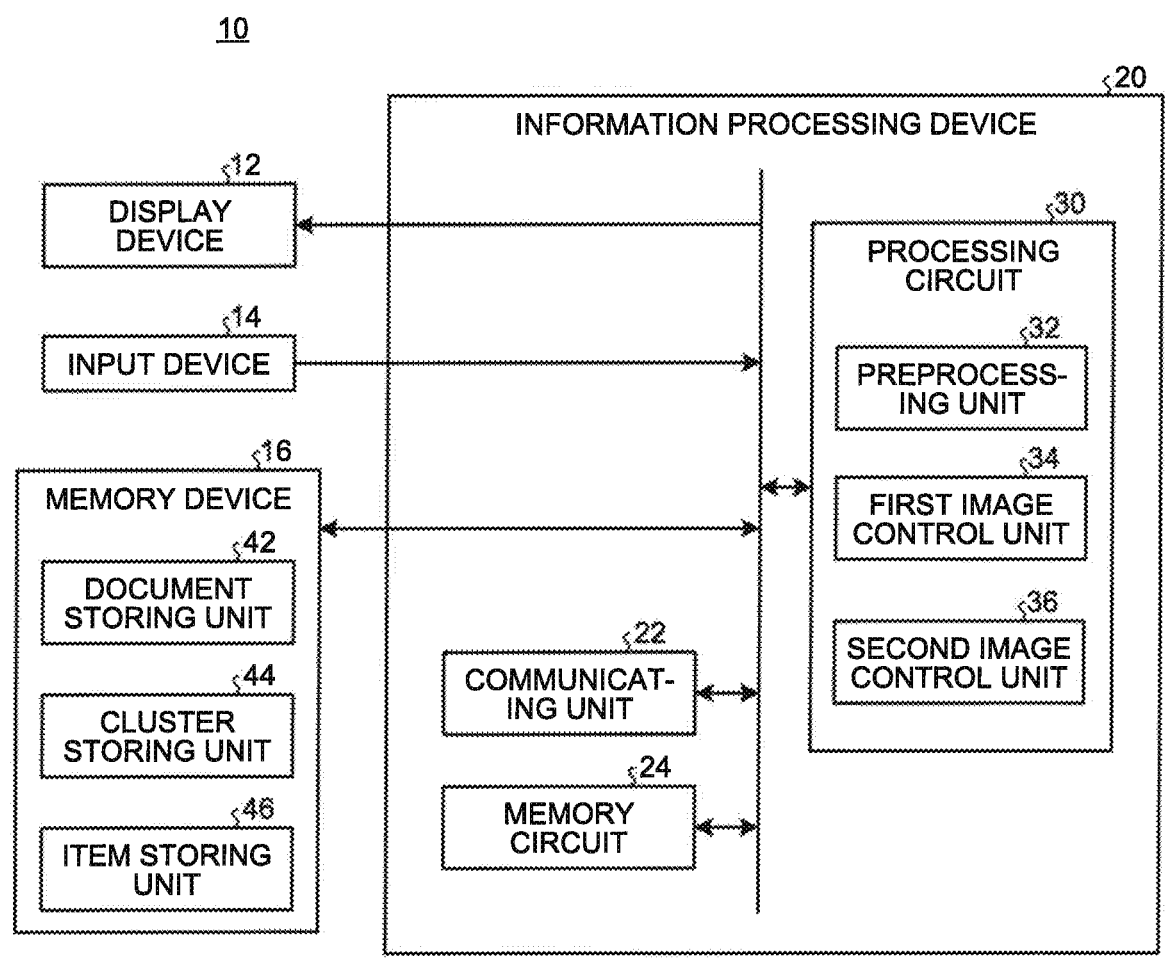
FIG. 1 is a configuration diagram of a document management system according to a first embodiment.

An information processing device according to an embodiment includes one or more processors. The processors perform hierarchical clustering of a key phrase group. The processors divide the key phrase group into candidate clusters. The processors receive a selectin operation of one item from predetermined items for classifying the document group. The processors calculate, for each candidate cluster, a score indicating utility with respect to the selected item. The processors decide, as a reference cluster, a candidate cluster for which the score has a predetermined ranking. The processors divide the reference cluster into sub-clusters. The processors extract predetermined sub-items in the lower levels of the selected item. And the processors control presentation of an expansion image for expressing the information volume of the documents for each sub-item and each sub-cluster.

Exemplary embodiments of a document management system 10 are described below with reference to the accompanying drawings. In the embodiments described below, the constituent elements referred to by the same reference numerals have a substantially identical configuration and perform substantially identical operations. Hence, the same explanation is not repeated, and only the differences are explained.

First Embodiment

FIG. 1 is a diagram illustrating a configuration of the document management system 10 according to the first embodiment. The document management system 10 manages a document group that includes a plurality of documents created in business assignments. Moreover, in response to a user operation, the document management system 10 classifies the document group, and displays information volume of each of a plurality of classified documents.

Regarding a document, as long as it is possible to search for the information contents using a computer, the document can be any type of data. For example, a document can be data containing text or can be data containing a program code. Regarding the file format of documents, as long as the file format is processible in the document management system 10, any file format can be used.

Moreover, the information volume of a plurality of documents can represent the number of documents, or can represent the number of characters included in the documents, or can represent the total data volume of the documents.

Meanwhile, the document management system 10 extracts one or more key phrases from a single document. A key phrase represents information indicating the features of the concerned document, such as the information included in the document and the information related to the document. A key phrase can be a single word or can be a string of words. Alternatively, a key phrase can be a code string in a program code.

The document management system 10 includes a display device 12, an input device 14, a memory device 16, and an information processing device 20.

The display device 12 displays images and presents them to the user. The display device 12 receives images generated by the information processing device 20, and displays the received images. Examples of the display device 12 include a liquid crystal display.

The input device 14 receives instructions and operations from the user. Examples of the input device 14 include a pointing device such as a mouse or a trackball and an input device such as a keyboard.

The memory device 16 receives data from the information processing device 20 and stores therein the received data. Moreover, the data stored in the memory device 16 is read by the information processing device 20. Examples of the memory device 16 include a semiconductor memory element such as a flash memory; a hard disk; and an optical disk. Alternatively, the memory device 16 can be a server device connectable to the information processing device 20 via a network.

The information processing device 20 is, for example, a dedicated computer or a general-purpose computer. Alternatively, the information processing device 20 can be a personal computer (PC) or a computer included in a server meant for storing and managing information. The information processing device 20 can be implemented using a single device or can be implemented using a plurality of devices operating in cooperation. Alternatively, the information processing device 20 can be a virtual device (such as a cloud device) implemented in a network.

The information processing device 20 controls the display device 12 and displays images in the display device 12. Moreover, the information processing device 20 receives information from the input device 14 and distinguishes between the instruction details and the operation details provided by the user. Furthermore, the information processing device 20 writes data in the memory device 16 and reads the stored data from the memory device 16.

The information processing device 20 includes a communicating unit 22, a memory circuit 24, and a processing circuit 30. The display device 12, the input device 14, the memory device 16, the communicating unit 22, the memory circuit 24, and the processing circuit 30 are connected to each other by a bus.

The communicating unit 22 is an interface for receiving input of information from and outputting information to external devices that are connected in a wired manner or a wireless manner. The communicating unit 22 can establish connection with a network and perform communication.

The memory circuit 24 includes a random access memory (RAM) and a read only memory (ROM). The memory circuit 24 stores a start-up program that reads a boot program. Moreover, the memory circuit 24 functions as the work area of the processing circuit 30.

The processing circuit 30 includes one or more processors. The processing circuit 30 performs information processing; reads a computer program and loads it in the memory circuit 24 before executing it; controls the constituent elements and performs data input-output; and processes data. Examples of a processor include a central processing unit (CPU). However, the processor is not limited to a CPU, and alternatively can be a data processing device of a different type for executing computer programs or can be a dedicated processing device.

In the document management system 10 having such a hardware configuration, the memory device 16 functions as a document storing unit 42, as a cluster storing unit 44, and as an item storing unit 46. Moreover, in the document management system 10 having such a hardware configuration, the processing circuit 30 executes a computer program and resultantly functions as a preprocessing unit 32, as a first image control unit 34, and as a second image control unit 36.

Figure 2:
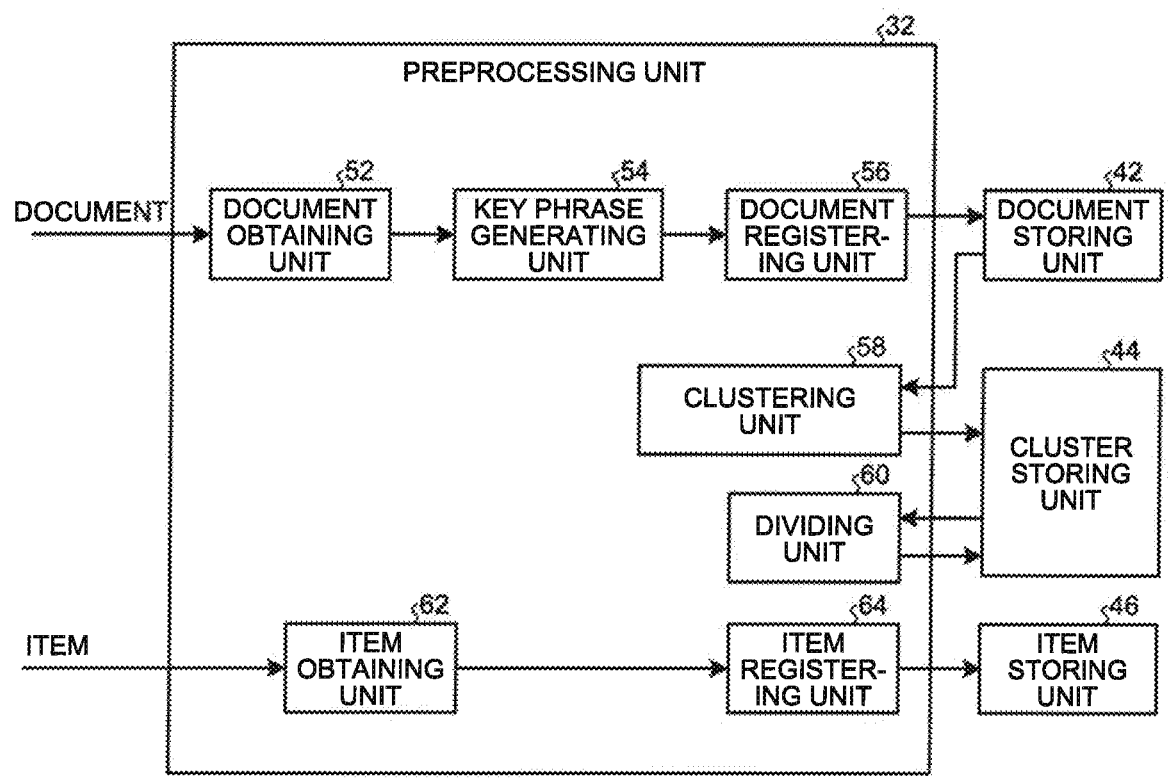
FIG. 2 is a configuration diagram of a preprocessing unit according to the first embodiment.

FIG. 2 is a diagram illustrating a configuration of the preprocessing unit 32 along with illustrating the document storing unit 42, the cluster storing unit 44, and the item storing unit 46 according to the first embodiment.

The preprocessing unit 32 includes a document obtaining unit 52, a key phrase generating unit 54, a document registering unit 56, a clustering unit 58, a dividing unit 60, an item obtaining unit 62, and an item registering unit 64.

The document obtaining unit 52 obtains a document from another device. The key phrase generating unit 54 performs morphological analysis and compound word extraction with respect to the document obtained by the document obtaining unit 52, and generates one or more key phrases corresponding to the obtained document. The document registering unit 56 stores, in the document storing unit 42, the document, which is obtained by the document obtaining unit 52, in a corresponding manner to the one or more key phrases generated by the key phrase generating unit 54.

The document obtaining unit 52, the key phrase generating unit 54, and the document registering unit 56 perform the operations for each of a plurality of documents. As a result, the document storing unit 42 can store therein a document group of a plurality of documents. The document group is stored in the form of a database and, when an arbitrary key phrase is specified, one or more documents associated to the specified key phrase can be extracted.

The clustering unit 58 obtains a key phrase group of a plurality of key phrases included in the document group. Then, the clustering unit 58 performs hierarchical clustering of the obtained key phrase group. For example, the clustering unit 58 performs clustering of the key phrases, which are included in the key phrase group, into a plurality of clusters. Moreover, the clustering unit 58 performs vectorization of each key phrase. Then, the clustering unit 58 calculates the degrees of similarity of the key phrases according to the respective vector distances from the corresponding cluster center. The clustering unit 58 repeatedly performs identical operations in each cluster, and generates a plurality of hierarchized clusters.

The clustering unit 58 can assign a label to each of a plurality of hierarchized clusters. For example, the clustering unit 58 can use, as the label, the key phrase close to the corresponding cluster center. Then, the clustering unit 58 stores the hierarchically-clustered key phrase group in the cluster storing unit 44.

The dividing unit 60 reads the hierarchically-clustered key phrase group from the cluster storing unit 44, and divides the key phrase group into a plurality of candidate clusters. For example, the dividing unit 60 draws a dendrogram indicating the hierarchically-clustered key phrase group and decides, in the drawn dendrogram, the height for dividing the key phrase group into a predetermined number of (for example, a minimum of four) clusters. Then, the dividing unit 60 sets, as a plurality of candidate clusters, a plurality of hierarchical clusters generated as a result of cutting the dendrogram at the decided height. Moreover, the dividing unit 60 stores the generated candidate clusters in the cluster storing unit 44.

The item obtaining unit 62 obtains, from other devices, a plurality of predetermined items meant for classifying the document group. The item obtaining unit 62 can also obtain a plurality of items input by the user. Herein, the items are hierarchized using a tree structure. The item registering unit 64 stores the items, which are obtained by the item obtaining unit 62, in the item storing unit 46.

Figure 3:
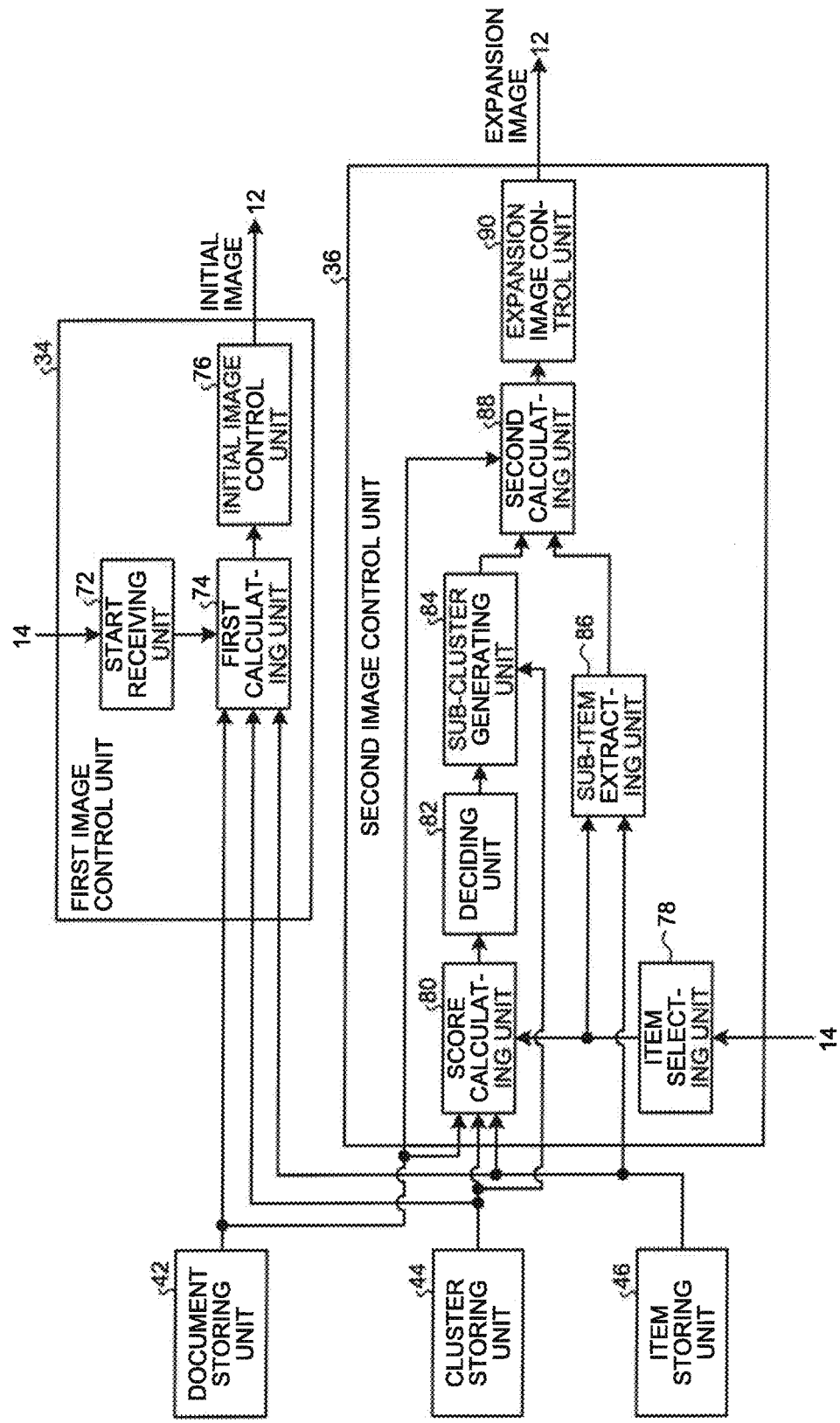
FIG. 3 is a configuration diagram of a first image control unit and a second image control unit according to the first embodiment.

FIG. 3 is a diagram illustrating a configuration of the first image control unit 34 and the second image control unit 36 along with illustrating the document storing unit 42, the cluster storing unit 44, and the item storing unit 46 according to the first embodiment.

The first image control unit 34 includes a start receiving unit 72, a first calculating unit 74, and an initial image control unit 76. The start receiving unit 72 receives a start operation performed by the user from the input device 14.

Once the start receiving unit 72 receives the start operation, the first calculating unit 74 obtains the candidate clusters from the cluster storing unit 44. Moreover, once the start receiving unit 72 receives the start operation, the first calculating unit 74 obtains, from the item storing unit 46, a plurality of topmost items from among a plurality of predetermined items.

Then, the first calculating unit 74 accesses the document storing unit 42 and calculates the information volume of the documents corresponding to each of a plurality of predetermined items and corresponding to each of a plurality of candidate clusters. That is, the first calculating unit 74 classifies the document group into a plurality of initial document groups according to a plurality of topmost items. Then, for each of a plurality of initial document groups, the first calculating unit 74 calculates the information volume of the documents classified into each of a plurality of candidate clusters. For example, when there are four topmost items and five candidate clusters, the first calculating unit 74 calculates the information volume of 4×5=20 documents.

The initial image control unit 76 controls the presentation of the initial image with the aim of expressing the information volume of the documents corresponding to each of a plurality of predetermined items and corresponding to each of a plurality of candidate clusters. That is, for each of a plurality of initial document groups obtained by classifying the document group according to a plurality of topmost items, the initial image control unit 76 generates an initial image indicating the information volume of the documents classified into each of a plurality of candidate clusters. Then, the initial image control unit 76 outputs the generated initial image to the display device 12, and displays the initial image in the display device 12.

The second image control unit 36 includes an item selecting unit 78, a score calculating unit 80, a deciding unit 82, a sub-cluster generating unit 84, a sub-item extracting unit 86, a second calculating unit 88, and an expansion image control unit 90.

The item selecting unit 78 receives, from the input device 14, a selection operation performed by the user for selecting any one item from among a plurality of predetermined items meant for classifying the document group. For example, after the initial image is displayed, the item selecting unit 78 receives a selection operation regarding any one item from among a plurality of topmost items regarding which the information volume is displayed in the initial image.

The score calculating unit 80 calculates, for each of a plurality of candidate clusters, a score indicating the utility with respect to the selected item. The details regarding the score are given later.

The deciding unit 82 decides, as a reference cluster, the candidate cluster for which the calculated score has a predetermined ranking from among a plurality of candidate clusters. For example, the deciding unit 82 decides, as the reference cluster, the candidate cluster having the score indicating the highest utility from among a plurality of candidate clusters.

The sub-cluster generating unit 84 divides the reference cluster into a plurality of sub-clusters. For example, the sub-cluster generating unit 84 divides the reference cluster into a predetermined number (for example, a minimum of four) of parts and generates a plurality of sub-clusters.

The sub-item extracting unit 86 accesses the item storing unit 46 and extracts a plurality of predetermined sub-items in the lower levels of the item selected by the item selecting unit 78.

The second calculating unit 88 obtains a plurality of sub-clusters from the sub-cluster generating unit 84. Moreover, the second calculating unit 88 obtains a plurality of predetermined sub-items from the sub-item extracting unit 86.

Then, the second calculating unit 88 accesses the document storing unit 42 and calculates the information volume of the documents corresponding to each of a plurality of predetermined sub-items and corresponding to each of a plurality of sub-clusters. That is, the second calculating unit 88 classifies an initial document group, which is classified into a single selected topmost item, further into a plurality of subdocument groups according to a plurality of sub-items. Then, for each of a plurality of subdocument groups, the second calculating unit 88 calculates the information volume of the documents classified into each of a plurality of sub-clusters. For example, when there are five sub-items and six sub-clusters, the second calculating unit 88 calculates the information volume of 5×6=30 documents.

The expansion image control unit 90 controls the presentation of an expansion image with the aim of expressing the information volume of the documents corresponding to each of a plurality of predetermined sub-items and corresponding to each of a plurality of sub-clusters. That is, regarding each of a plurality of sub-document groups, the expansion image control unit 90 generates an expansion image indicating the information volume of the documents classified into each of a plurality of sub-clusters. Then, the expansion image control unit 90 outputs the generated expansion image to the display device 12, and displays the expansion image in the display device 12.

Meanwhile, after an expansion image is displayed, the item selecting unit 78 can receive a selection operation regarding any one sub-item from among a plurality of sub-items for which the information volume is displayed in the expansion image. When any one sub-item from among a plurality of sub-items is selected, the score calculating unit 80, the deciding unit 82, the sub-cluster generating unit 84, the sub-item extracting unit 86, the second calculating unit 88, and the expansion image control unit 90 substitute a plurality of sub-items with a plurality of items; substitute a plurality of sub-clusters with a plurality of candidate clusters; again perform operations; and control the presentation of a new expansion image.

Figure 4:
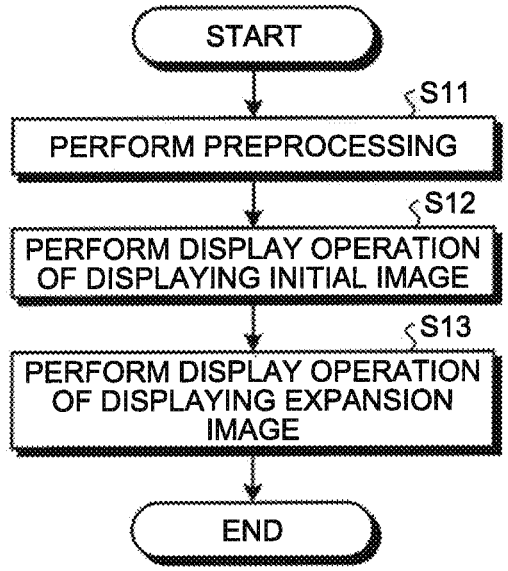
FIG. 4 is a flowchart for explaining a flow of operations performed in an information processing device.

FIG. 4 is a flowchart for explaining a flow of operations performed in the information processing device 20. Firstly, at S11, the information processing device 20 performs preprocessing. Then, at S12, the information processing device 20 performs a display operation for displaying an initial image. Subsequently, at S13, the information processing device 20 performs a display operation for displaying an expansion image. Regarding the operations performed at S11, S12, and S13; the detailed explanation is given below.

Figure 5:
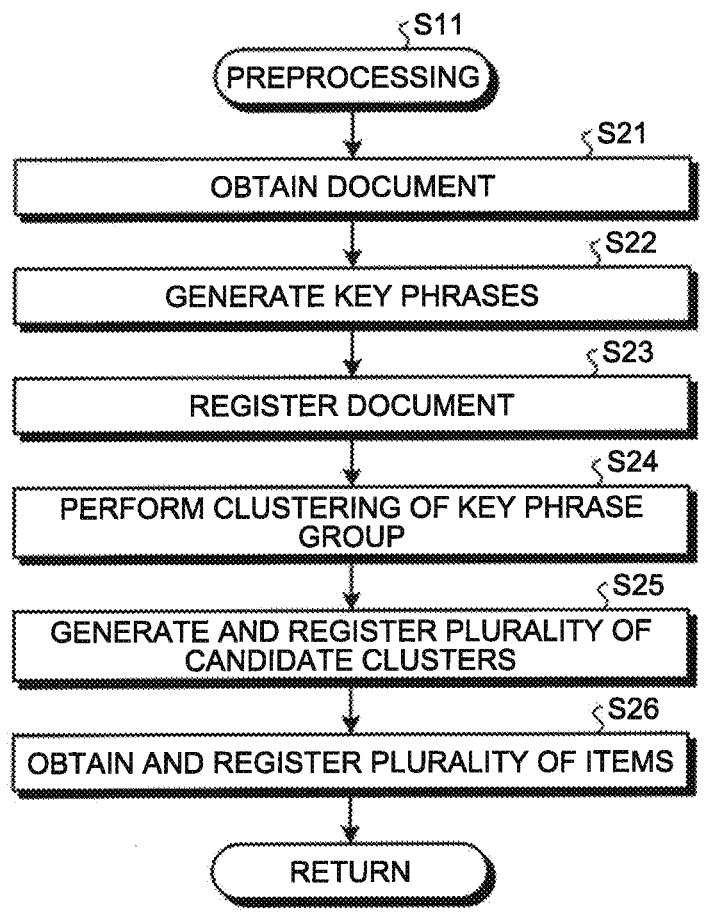
FIG. 5 is a flowchart for explaining a detailed flow of operations performed during preprocessing.

FIG. 5 is a flowchart for explaining a detailed flow of operations performed during the preprocessing (S11). During the preprocessing performed at S11, the information processing device 20 performs operations from S21 to S26 as explained below.

At S21, the information processing device 20 obtains a document from another device. Then, at S22, the information processing device 20 performs morphological analysis and compound word extraction with respect to the obtained document, and generates one or more key phrases corresponding to the obtained document. Subsequently, at S23, the information processing device 20 registers, in the document storing unit 42, the obtained document in a corresponding manner to the one or more generated key phrases.

The information processing device 20 performs the operations from S21 to S23 for each of a plurality of documents. As a result, a document group of a plurality of documents can be stored in the document storing unit 42. The document group is stored in the form of a database. When an arbitrary key phrase is specified with respect to the document group, the information processing device 20 can extract one or more documents associated to the specified key phrase from the document group.

Subsequently, at S24, the information processing device 20 obtains a key phrase group of a plurality of key phrases included in the document group from the document storing unit 42. Then, the information processing device 20 performs hierarchical clustering of the obtained key phrase group. Moreover, the information processing device 20 can also assign a label to each of a plurality of hierarchized clusters. Then, the information processing device 20 registers the hierarchically-clustered key phrase group in the cluster storing unit 44.

Then, at S25, the information processing device 20 reads the hierarchically-clustered key phrase group from the cluster storing unit 44, and divides the key phrase group into a plurality of candidate clusters. The information processing device 20 registers the generated candidate clusters in the cluster storing unit 44.

Subsequently, at S26, the information processing device 20 obtains, from other devices, a plurality of predetermined items meant for classifying the document group. Moreover, the information processing device 20 can also obtain a plurality of items input by the user. Then, the information processing device 20 stores the obtained items and the hierarchical structure of the items in the item storing unit 46.

Figure 6:
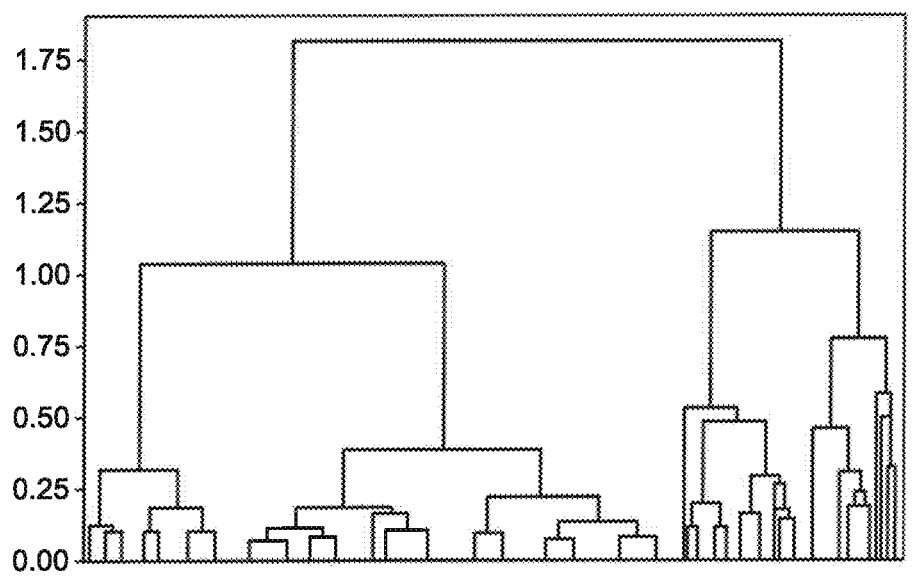
FIG. 6 is a diagram illustrating an exemplary dendrogram representing a structure of a key phrase group.

FIG. 6 is a diagram illustrating an exemplary dendrogram representing a structure of the key phrase group that has been subjected to hierarchical clustering at S24. When the key phrase group is subjected to hierarchical clustering, for example, the information processing device 20 can generate a plurality of clusters having the hierarchical structure represented by the dendrogram illustrated in FIG. 6. In the dendrogram illustrated in FIG. 6, key phrases are associated to terminal nodes. Moreover, the height direction indicates the degree of similarity among the key phrases.

Figure 7:
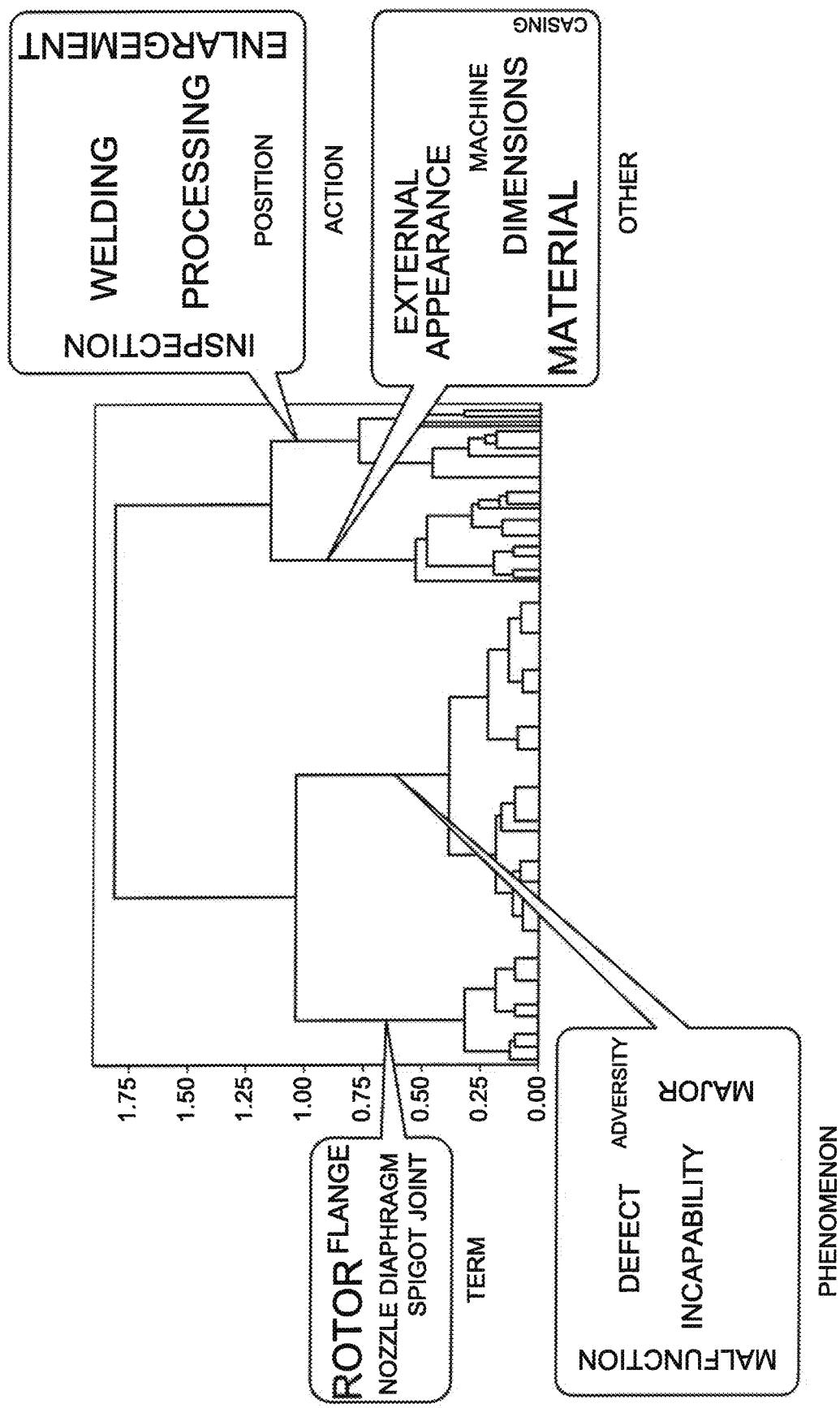
FIG. 7 is a diagram illustrating an exemplary dendrogram and an example of candidate clusters.

FIG. 7 is a diagram illustrating an exemplary dendrogram that represents a structure of the key phrase group and illustrating an example of candidate clusters generated at S25. For example, the information processing device 20 divides the hierarchically-clustered key phrase group and generates a plurality of candidate clusters. For example, based on the dendrogram illustrated in FIG. 7, the information processing device 20 generates a predetermined number of (for example, a minimum of four) candidate clusters. Moreover, the information processing device 20 can assign a label to each of a plurality of candidate clusters. For example, the information processing device 20 can set, as the label of a candidate cluster, the key phrase close to the center position of that candidate cluster.

In the example illustrated in FIG. 7, the information processing device 20 cuts the clusters at the degree of similarity of 1.00 and generates four candidate clusters. More particularly, the information processing device 20 generates a candidate cluster having a label "action" assigned thereto, generates a candidate cluster having a label "phenomenon" assigned thereto, generates a candidate cluster having a label "term" assigned thereto, and generates a candidate cluster having a label "other" assigned thereto.

Figure 8:
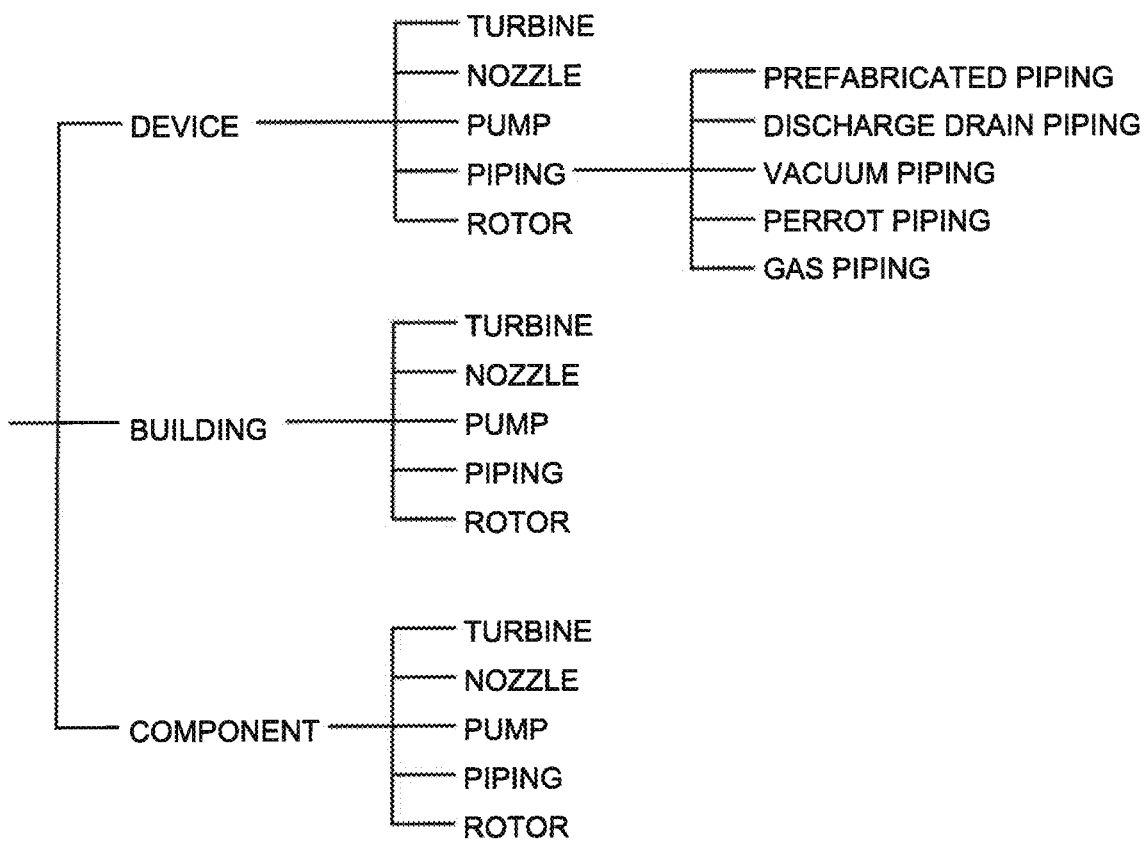
FIG. 8 is a diagram illustrating a hierarchical structure of a plurality of items.

FIG. 8 is a diagram illustrating a hierarchical structure of a plurality of items obtained at S26. For example, the information processing device 20 obtains a plurality of items hierarchized in a tree structure as illustrated in FIG. 8. The contents and the hierarchical structure of the items are set in advance by the user, for example. The information processing device 20 obtains such items from other devices. Moreover, the information processing device 20 can also obtain a plurality of items input by the user.

Each of a plurality of items represents information meant for classifying the document group. The information processing device 20 can specify any one of items with respect to the document group stored in the memory device 16, and can obtain the documents associated to that item.

Figure 9:
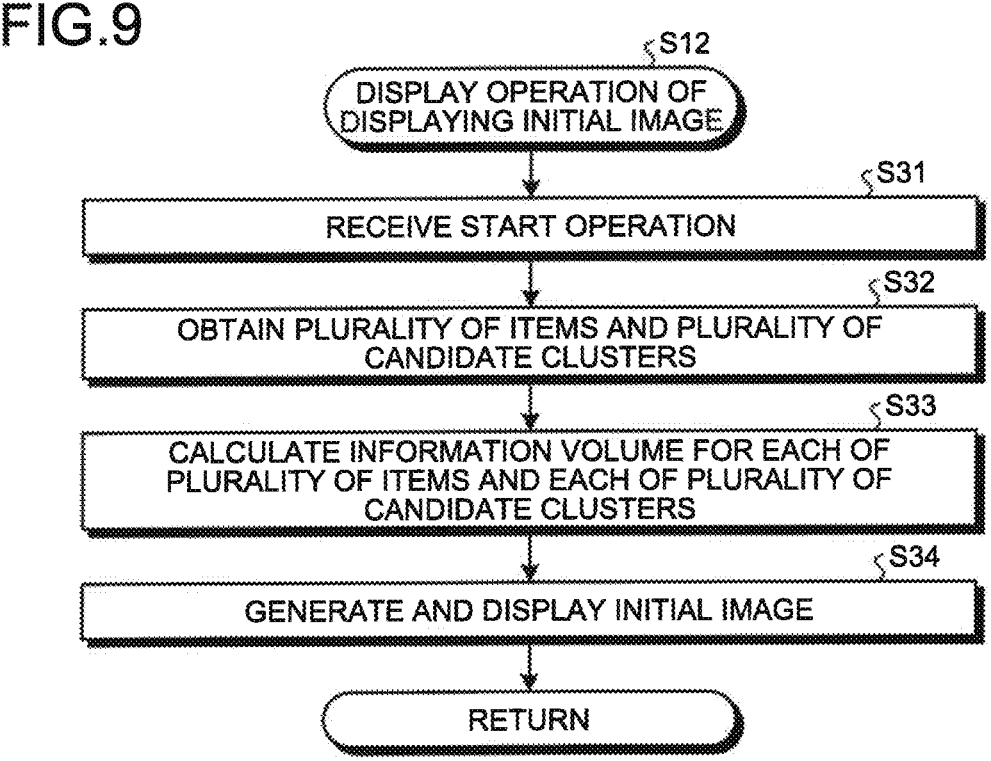
FIG. 9 is a flowchart for explaining a detailed flow of operations performed during a display operation of displaying an initial image.

FIG. 9 is a flowchart for explaining a detailed flow of operations performed during the display operation of displaying an initial image (S12). During the display operation of displaying an initial image as performed at S12, the information processing device 20 performs operations from S31 to S34 explained below.

At S31, the information processing device 20 receives a start operation performed by the user from the input device 14. Then, at S32, the information processing device 20 obtains a plurality of candidate clusters from the cluster storing unit 44. Moreover, the information processing device 20 obtains, from the item storing unit 46, a plurality of topmost items from among a plurality of predetermined items.

Subsequently, at S33, the information processing device 20 accesses the document storing unit 42 and calculates the information volume of the documents corresponding to each of a plurality of predetermined items and corresponding to each of a plurality of candidate clusters. That is, the information processing device 20 classifies the document group into a plurality of initial document groups according to a plurality of topmost items. Then, for each of a plurality of initial document groups, the information processing device 20 calculates the information volume of the documents classified into each of a plurality of candidate clusters.

Subsequently, at S34, the information processing device 20 generates an initial image based on the information volume of the documents corresponding to each of a plurality of items and corresponding to each of a plurality of candidate clusters. Then, the information processing device 20 outputs the generated initial image to the display device 12, and displays the initial image in the display device 12.

Figure 10:
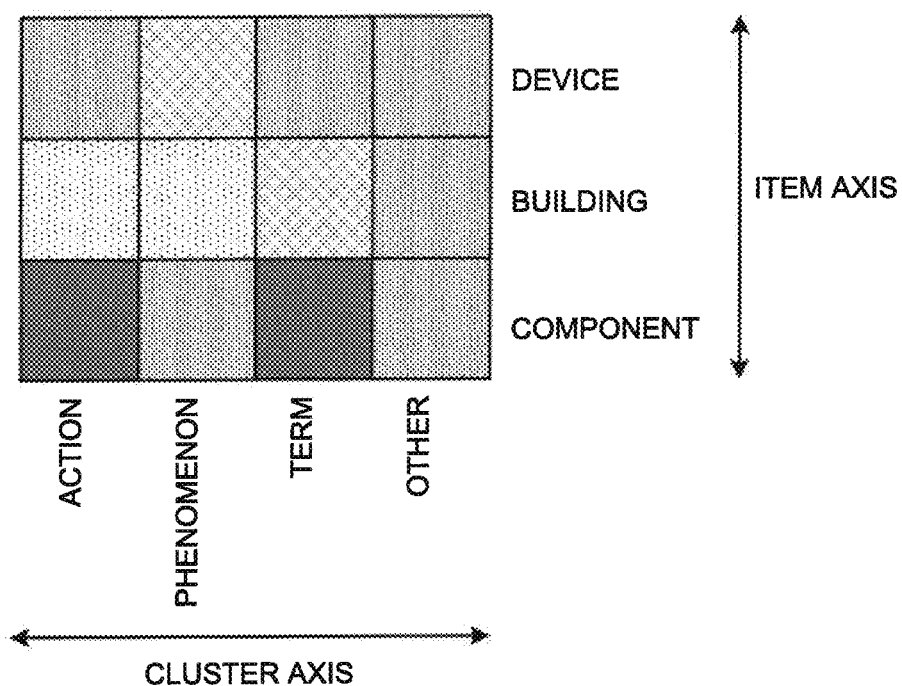
FIG. 10 is a diagram illustrating an exemplary initial image.

FIG. 10 is a diagram illustrating an exemplary initial image displayed at S34. At S34, the information processing device 20 generates, for example, a heat map-like initial image as illustrated in FIG. 10.

The initial image has a two-dimensional grid-like pattern in which one axis (an item axis) represents the items and the other axis (a cluster axis) represents the candidate clusters. In the example illustrated in FIG. 10, the vertical axis represents the item axis, and the horizontal axis represents the cluster axis. In the initial image, the brightness or the concentration of each of a plurality of grids indicates the information volume of the documents classified according to the corresponding item and the corresponding candidate cluster.

For example, in the initial image illustrated in FIG. 10, the item axis indicates three items, namely, "device", "building", and "component". Moreover, in the initial image, the cluster axis indicates four candidate clusters, namely, "action", "phenomenon", "term", and "other". Furthermore, in the initial image, the brightness or the concentration of the grid corresponding to the item "device" and the candidate cluster "action" indicates the information volume of the documents classified into the item "device" and the candidate cluster "action". The same is the case regarding the brightness or the concentration of the other grids.

Meanwhile, the initial image is not limited to a heat map-like image as illustrated in FIG. 10. Alternatively, for example, in the initial image, the information volume can be expressed using colors instead of the brightness or the concentration. Still alternatively, in the initial image, the information volume can be expressed using numerical values or characters. Still alternatively, in the initial image, the information volume can be expressed using differences in the types of objects or icons; or can be expressed using the sizes of label characters, or using the font types, or using the variations in pictorial figures such as the variations in the drawing lines or slope of lines. Moreover, the initial image is not limited to a two-dimensional map and alternatively can be an image in which the information volume is character information expressed as short sentence comments or as a list, or in which the information volume is expressed using a shape having three or more dimensions such as a stereoscopic shape.

Meanwhile, in the initial image displayed in the display device 12, the user can select, using the input device 14, any one item from among a plurality of items displayed along the item axis. The selection operation can be performed using a pointing device such as a mouse, or can be performed using voice.

Figure 11:
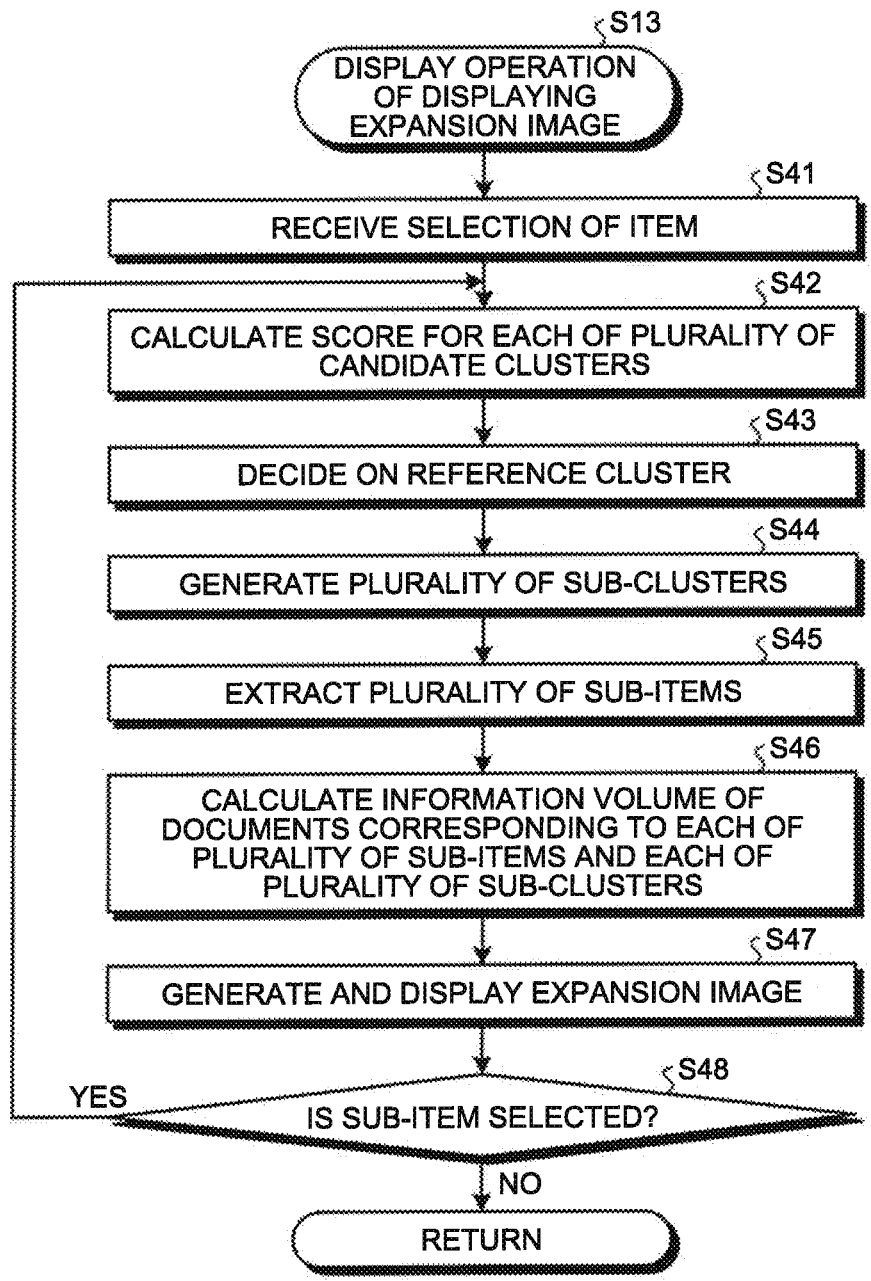
FIG. 11 is a flowchart for explaining a detailed flow of operations performed during a display operation of displaying an expansion image.

FIG. 11 is a flowchart for explaining a detailed flow of operations performed during the display operation of displaying an expansion image (S13). During the display operation performed at S13 for displaying an expansion image, the information processing device 20 performs operations from S41 to S48 explained below.

At S41, the information processing device 20 receives, from the input device 14, a selection operation performed by the user for selecting any one item from among a plurality of items displayed in the initial image.

Then, at S42, for each of a plurality of candidate clusters, the information processing device 20 calculates the score indicating the utility with respect to the item selected at S41. Regarding the score, the details are explained later with reference to FIG. 15.

Subsequently, at S43, from among a plurality of candidate clusters, the information processing device 20 decides, as the reference cluster, the candidate cluster for which the calculated score has a predetermined ranking from among a plurality of candidate clusters. For example, the deciding unit 82 decides, as the reference cluster, the candidate cluster having the score indicating the highest utility from among a plurality of candidate clusters.

Then, at S44, the information processing device 20 divides the reference cluster into a plurality of sub-clusters. For example, the information processing device 20 divides the reference cluster into a predetermined number (for example, a minimum of four) of parts and generates a plurality of sub-clusters. Moreover, in this case, the information processing device 20 can assign a label to each of a plurality of sub-clusters. As the label, it is possible to use the sub-phrase close to the center of the concerned sub-cluster.

Subsequently, at S45, the information processing device 20 extracts, from the item storing unit 46, a plurality of predetermined sub-items in the lower levels of the selected item.

Then, at S46, the information processing device 20 accesses the document storing unit 42 and extracts the information volume of the documents corresponding to each of a plurality of sub-items and corresponding to each of a plurality of sub-clusters. That is, the information processing device 20 further divides the initial document group of the selected item according to a plurality of sub-items and generates a plurality of sub-document groups. Then, for each of a plurality of sub-document groups, the information processing device 20 calculates the information volume of the documents classified into each of a plurality of sub-clusters.

Subsequently, at S47, the information processing device 20 generates an expansion image based on the information volume of the documents corresponding to each of a plurality of sub-items and corresponding to each of a plurality of sub-clusters. Then, the information processing device 20 outputs the generated expansion image to the display device 12, and displays the expansion image in the display device 12.

Then, at S48, after the expansion image is displayed, the information processing device 20 determines whether or not a selection operation for selecting any one sub-item from among a plurality of sub-items is received. When a selection operation for selecting any one sub-item is received (Yes at S48), the information processing device 20 returns the system control to S42. Then, the information processing device 20 substitutes a plurality of sub-items with a plurality of items; substitutes a plurality of sub-clusters with a plurality of candidate clusters; again performs the operations from S42 to S47; and generates a new expansion image.

Meanwhile, after the expansion image is displayed, if no sub-item is selected and if an end operation is performed (No at S48); then the information processing device 20 ends the present flow of operations.

Figure 12:
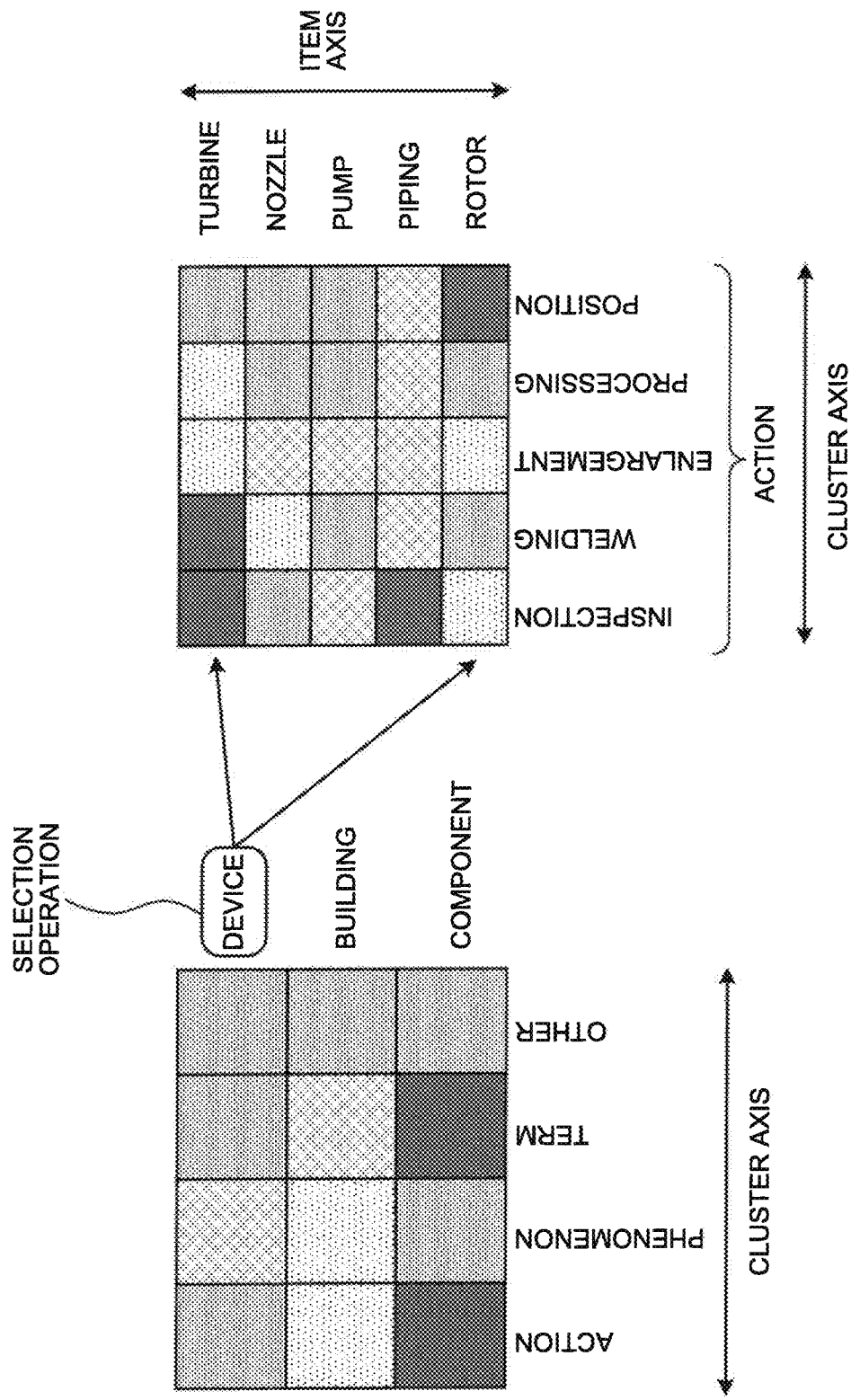
FIG. 12 is a diagram illustrating an example of an initial image and an expansion image.

FIG. 12 is a diagram illustrating an example of an initial image and an expansion image. In the state in which an initial image is being displayed, when any one item is selected, the information processing device 20 generates an expansion image of the heat map type as illustrated in the right-hand side in FIG. 12, and displays the expansion image in the display device 12.

The expansion image has a two-dimensional grid-like pattern in which one axis (an item axis) represents the sub-items and the other axis (a cluster axis) represents the sub-clusters. In the example illustrated in FIG. 12, the vertical axis represents the item axis, and the horizontal axis represents the cluster axis. Then, in an identical manner to the initial image, the brightness or the concentration of each of a plurality of grids indicates the information volume of the documents classified according to the corresponding sub-item and the corresponding sub-cluster.

For example, in the example illustrated in FIG. 12, from among a plurality of items displayed along the item axis of the initial image, the item "device" is selected by the user. In response to the selection of the item "device", the information processing device 20 extracts five sub-items, namely, "turbine", "nozzle", "pump", "piping", and "rotor" in the lower levels of the item "device".

Moreover, in the example illustrated in FIG. 12, in response to the selection of the item "device", the information processing device 20 calculates, for each of the four candidate clusters, namely, "action", "phenomenon", "term", and "other", the score indicating the utility with respect to the selected item "device". Then, the information processing device 20 decides, as the reference cluster, the candidate cluster "action" having the highest score. Moreover, the information processing device 20 divides the reference cluster "action" and generates five sub-clusters, namely, "inspection", "welding", "enlargement", "processing", and "position".

Then, the information processing device 20 generates the expansion image as illustrated in FIG. 12. In the expansion image illustrated in FIG. 12, the item axis represents the five sub-items, namely, "turbine", "nozzle", "pump", "piping", and "rotor" in the lower levels of the item "device". Moreover, in this expansion image, the cluster axis represents the five sub-clusters, namely, "inspection", "welding", "enlargement", "processing", and "position".

Meanwhile, in an identical manner to the initial image, the expansion image too is not limited to a heat map-like image. Moreover, in the expansion image displayed in the display device 12, the user can select, using the input device 14, any one sub-item from among a plurality of sub-items displayed along the item axis.

Figure 13:
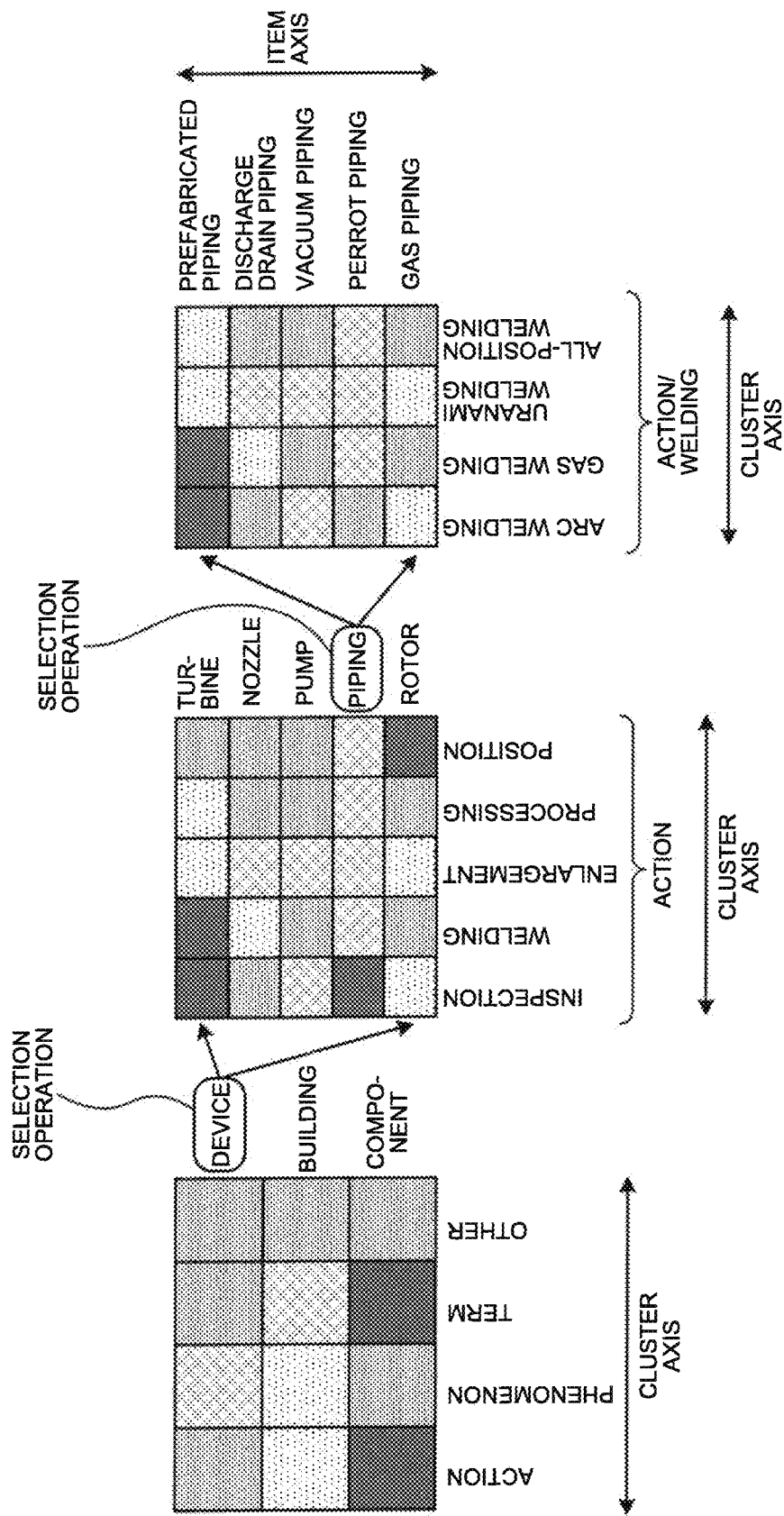
FIG. 13 is a diagram illustrating an example of an initial image, an expansion image, and a new expansion image.

FIG. 13 is a diagram illustrating an example of an initial image, an expansion image, and a new expansion image. In the state in which an expansion image is displayed, when any one sub-item is selected, the information processing device 20 generates a new expansion image and displays it in the display device 12. In that case, the information processing device 20 substitutes a plurality of sub-items with a plurality of items; substitutes a plurality of sub-clusters with a plurality of candidate clusters; again performs the operations for generating an expansion image; and generates a new expansion image.

Figure 14:
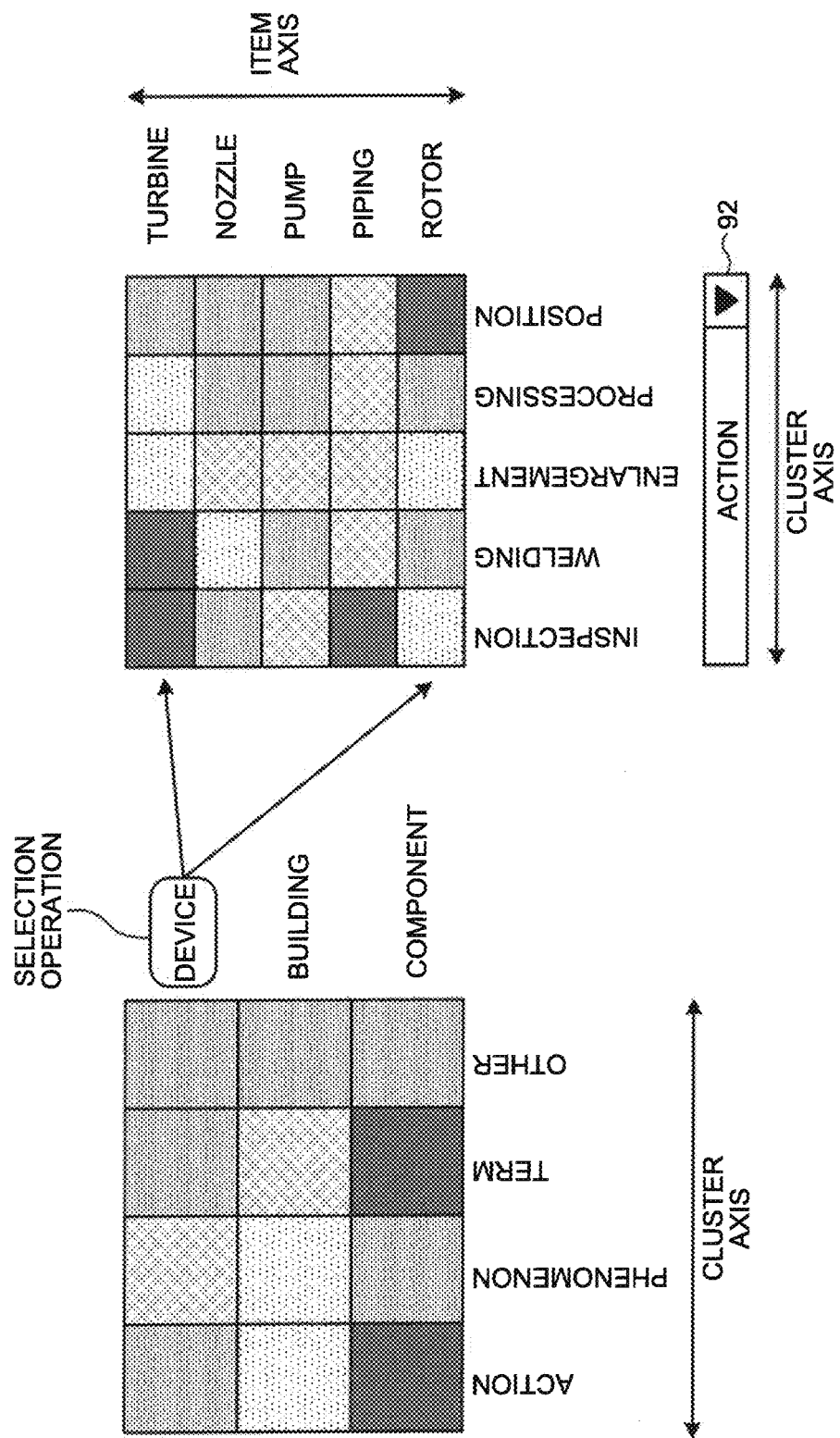
FIG. 14 is a diagram illustrating an expansion image in which a menu image is added.

FIG. 14 is a diagram illustrating an expansion image in which a menu image is added. In the information processing device 20, along with controlling the presentation of the expansion image, the expansion image control unit 90 can also control the presentation of a menu image so that one of a plurality of candidate clusters can be selected. For example, the menu image is a user interface image such as a pulldown menu 92 that enables the user to select one of a plurality of candidate clusters.

When a new candidate cluster is selected using the menu image, the expansion image control unit 90 of the information processing device 20 again presents an expansion image with the new candidate cluster serving as the reference cluster. More particularly, the sub-cluster generating unit 84 of the information processing device 20 divides the new candidate cluster, which serves as the reference cluster, into a plurality of sub-clusters.

The second calculating unit 88 of the information processing device 20 obtains a plurality of new sub-clusters from the sub-cluster generating unit 84. The second calculating unit 88 accesses the document storing unit 42 and calculates the information volume of the documents corresponding to each of a plurality of predetermined sub-items and corresponding to each of a plurality of new sub-clusters. Then, the expansion image control unit 90 generates a new expansion image indicating the information volume of the documents corresponding to each of a plurality of sub-items and corresponding to each of a plurality of new sub-clusters, and displays the new expansion image in the display device 12.

FIG. 15 is a diagram illustrating the score of each of a plurality of candidate clusters. In the initial image, when one item is selected, the information processing device 20 automatically selects a plurality of sub-clusters to be displayed along the cluster axis. In that case, in order to ensure that the sub-clusters having the highest utility with respect to the selected item are displayed along the cluster axis, the information processing device 20 calculates, for each of a plurality of candidate clusters, the score indicating the utility with respect to the selected item.

If "Cn" represents the n-th candidate cluster (where n is an integer equal to or greater than 1), then the information processing device 20 performs calculation according to Equation (1) described below and calculates a score (V(Cn)) of the n-th candidate cluster with respect to the selected item.

$$V(Cn) = \alpha + \beta + \gamma \tag{1}$$

Herein, $\alpha$ represents a first parameter of the score and indicates the information volume of such documents, which are classified into the selected item, in the concerned candidate cluster. Meanwhile, the first parameter $\alpha$ can also be a value obtained by multiplying the information volume of the documents by a coefficient.

For example, when the item "device" is selected and when the score of the candidate cluster "action" is to be calculated, the first parameter $\alpha$ indicates the value corresponding to the information volume of a plurality of documents classified into the item "device" from among the information volume of a plurality of documents included in the candidate cluster "action". For example, greater the information volume of such documents, which are classified into the selected item, in the concerned candidate cluster, the greater becomes the score.

Meanwhile, $\beta$ represents a second parameter of the score and indicates the dispersion of the information volume of the documents corresponding to each of a plurality of sub-items and corresponding to each of a plurality of sub-clusters obtained by dividing the concerned candidate cluster. Meanwhile, the second parameter $\beta$ can also be a value obtained by multiplying the dispersion by a coefficient.

For example, when the item "device" is selected and when the score of the candidate cluster "action" is to be calculated, the sub-items in the lower levels of the selected item are "turbine", "nozzle", "pump", "piping", and "rotor". Moreover, the sub-clusters obtained by dividing the concerned candidate cluster "action" are "inspection", "welding", "enlargement", "processing", and "position". The information processing device 20 calculates the information volume of the documents corresponding to each combination of each of the five sub-items, namely, "turbine", "nozzle", "pump", "piping", and "rotor" with each of the five sub-clusters, namely, "inspection", "welding", "enlargement", "processing", and "position". Thus, the second parameter $\beta$ represents the dispersion of the information volume for each combination. For example, the greater the dispersion, the greater becomes the score.

Meanwhile, $\gamma$ represents a third parameter and indicates the frequency or the ratio of the past selection of the concerned candidate cluster by the user. Herein, the third parameter $\gamma$ can also be a value obtained by multiplying a coefficient to the frequency or the ratio.

For example, when the item "device" is selected and when the score of the candidate cluster "action" is to be calculated, the third parameter $\gamma$ represents the frequency or the ratio of the past selection of the candidate cluster "action" using, for example, the menu image illustrated in FIG. 14 after the item "device" has been selected. Meanwhile, regarding the third parameter $\gamma$, a weight can be added to the frequency or the ratio so as to ensure that the temporally-newer selection operation has a greater impact than the temporally-older selection operation. For example, the greater the frequency or the ratio of past selection of the concerned candidate cluster as a result of user operations, the greater becomes the score.

Meanwhile, the score can be a value based on either any one of the parameters $\alpha$, $\beta$, and $\gamma$ or any two of the parameters $\alpha$, $\beta$, and $\gamma$. Alternatively, instead of using the parameters $\alpha$, $\beta$, and $\gamma$; the score can be expressed using some other parameters indicating the utility of the candidate cluster with respect to the selected item.

Effect of First Embodiment

As described above, the information processing device 20 according to the first embodiment classifies a document group using two axes according to the search intention and the user interest, and provides the information volume. In this case, the information processing device 20 performs classification according to predetermined items along one axis (the item axis), and performs classification using clustering along the other axis (the cluster axis). Subsequently, when one of a plurality of predetermined items is selected by the user, the information processing device 20 automatically extracts a plurality of sub-clusters useful for the selected item, and generates an expansion image.

For example, the information processing device 20 automatically extracts a plurality of sub-clusters in such a way that the information volume of the documents classified into the selected item becomes large. Moreover, for example, the information processing device 20 automatically extracts a plurality of sub-clusters in such a way that the dispersion of the information volume of the documents becomes large. Furthermore, for example, the information processing device 20 automatically extracts a plurality of sub-clusters selected highly-frequently in the past by the user.

In this way, since the information processing device 20 performs classification of the other axis (the cluster axis) according to clustering, the document group can be classified at low cost. Moreover, since the information processing device 20 classifies the other axis (the cluster axis) into a plurality of sub-clusters useful for the selected item, the document group can be appropriately classified. As described above, the information processing device 20 can present, at low cost, the information obtained by appropriately classifying the document group.

Second Embodiment

Given below is the explanation of the document management system 10 according to a second embodiment. The document management system 10 according to the second embodiment has a substantially identical configuration and has substantially identical functions to the document management system 10 according to the first embodiment. In the explanation of the second embodiment, the constituent elements having substantially identical functions and a substantially identical configuration to the constituent elements explained in the first embodiment are referred to by the same reference numerals, and thus the detailed explanation is given only for the differences.

Figure 16:
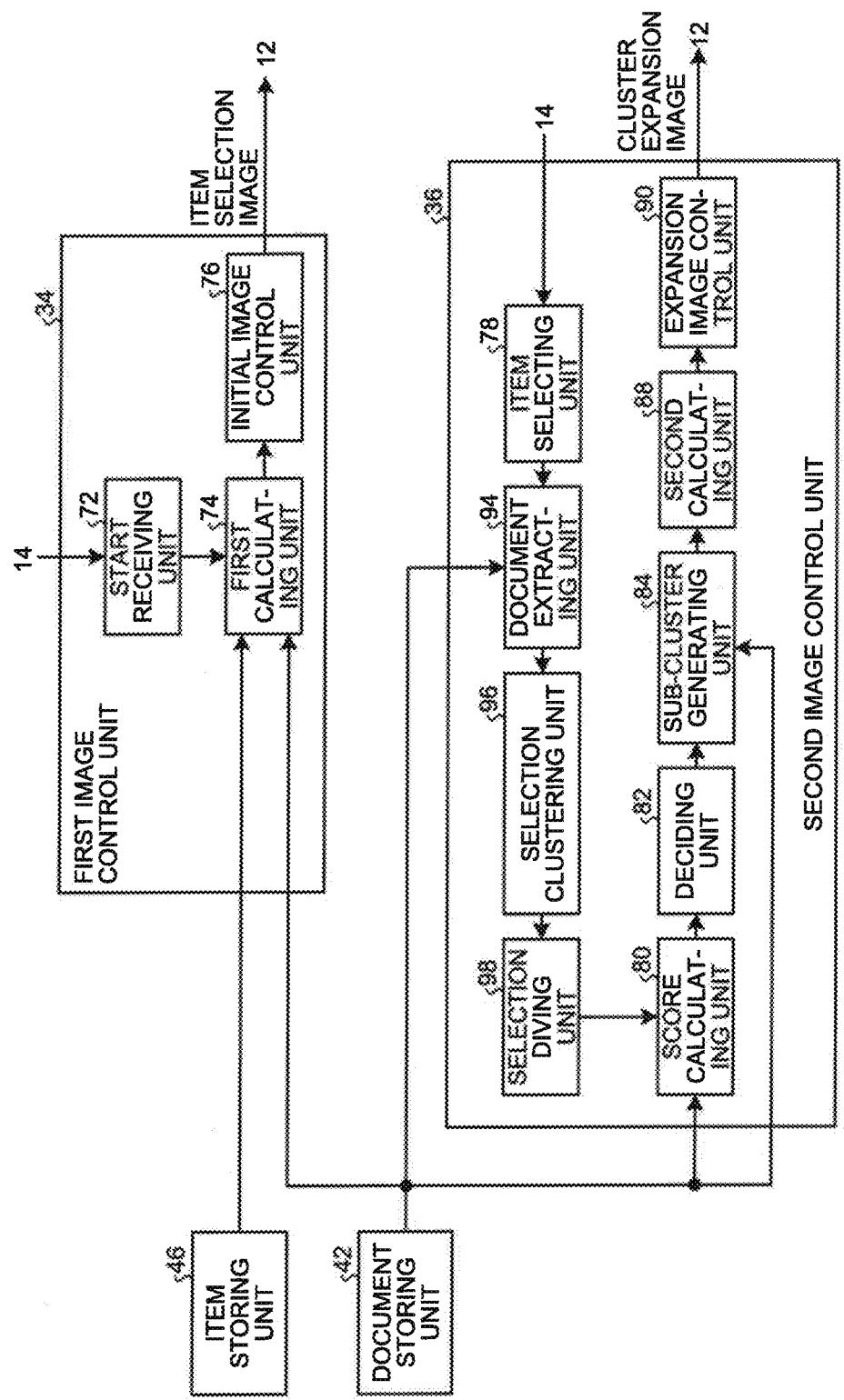
FIG. 16 is a configuration diagram of the first image control unit and the second image control unit according to a second embodiment.

FIG. 16 is a diagram illustrating a configuration of the first image control unit 34 and the second image control unit 36 along with illustrating the document storing unit 42 and the item storing unit 46 according to the second embodiment.

In the second embodiment, the item storing unit 46 stores a plurality of predetermined first-perspective items meant for classifying the document group according to a first perspective. Moreover, the item storing unit 46 stores a plurality of second-perspective items meant for classifying the document group according to a second perspective that is different than the first perspective.

The first image control unit 34 according to the second embodiment includes the start receiving unit 72, the first calculating unit 74, and the initial image control unit 76.

When the start receiving unit 72 receives a start operation, the first calculating unit 74 obtains a plurality of first-perspective items and a plurality of second-perspective items from the item storing unit 46. Then, the first calculating unit 74 accesses the document storing unit 42 and calculates the information volume of the documents corresponding to each of a plurality of predetermined first-perspective items and corresponding to each of a plurality of predetermined second-perspective items. That is, the first calculating unit 74 classifies the document group into a plurality of first-perspective document groups according to a plurality of first-perspective items. Then, for each of a plurality of first-perspective document groups, the first calculating unit 74 calculates the information volume of the documents classified into each of a plurality of second-perspective items.

The initial image control unit 76 controls the presentation of an item selection image with the aim of expressing the information volume of the documents corresponding to each of a plurality of predetermined first-perspective items and corresponding to each of a plurality of predetermined second-perspective items. That is, for each of a plurality of first-perspective document groups obtained by classifying the document group according to a plurality of first-perspective items, the initial image control unit 76 generates an item selection image indicating the information volume of the documents classified into each of a plurality of second-perspective items. Then, the initial image control unit 76 outputs the generated item selection image to the display device 12, and displays the item selection image in the display device 12.

The second image control unit 36 according to the second embodiment includes the item selecting unit 78, a document extracting unit 94, a selection clustering unit 96, a selection dividing unit 98, the score calculating unit 80, the deciding unit 82, the sub-cluster generating unit 84, the second calculating unit 88, and the expansion image control unit 90.

The item selecting unit 78 receives, from the input device 14, a selection operation performed by the user for selecting any one first-perspective item from among a plurality of first-perspective items and for selecting any one second-perspective item from among a plurality of second-perspective items.

The document extracting unit 94 accesses the document storing unit 42 and extracts, from the document group, a selection document group including a plurality of documents classified into the selected first-perspective item and the selected second-perspective item. The selection clustering unit 96 obtains a selection key phrase group that includes a plurality of key phrases included in the selection document group extracted by the document extracting unit 94. Then, the selection clustering unit 96 performs hierarchical clustering of the obtained selection key phrase group. The selection dividing unit 98 divides the hierarchically-clustered selection key phrase group into a plurality of candidate clusters.

The score calculating unit 80 calculates, for each of a plurality of candidate clusters divided by the selection dividing unit 98, the score indicating the utility with respect to the selected first-perspective item and the selected second-perspective item. The deciding unit 82 decides, as a first reference cluster and a second reference cluster, two candidate clusters for which the calculated scores have predetermined rankings from among a plurality of candidate clusters. For example, the deciding unit 82 decides, as the first reference cluster, the candidate cluster having the score indicating the highest utility from among a plurality of candidate clusters; and decides, as the second reference cluster, the candidate cluster having the score indicating the second highest utility from among a plurality of candidate clusters.

The sub-cluster generating unit 84 divides the first reference cluster into a plurality of first sub-clusters. For example, the sub-cluster generating unit 84 divides the first reference cluster into a predetermined number (for example, a minimum of four) of parts and generates a plurality of first sub-clusters. Moreover, the sub-cluster generating unit 84 divides the second reference cluster into a plurality of second sub-clusters. For example, the sub-cluster generating unit 84 divides the second reference cluster into a predetermined number (for example, a minimum of four) of parts and generates a plurality of second sub-clusters.

The second calculating unit 88 obtains a plurality of first sub-clusters and a plurality of second sub-clusters from the sub-cluster generating unit 84. Then, the second calculating unit 88 calculates the information volume of the documents corresponding to each of a plurality of first sub-clusters and corresponding to each of a plurality of second sub-clusters. That is, the second calculating unit 88 classifies the document group into a plurality of first sub-document groups according to a plurality of first sub-clusters. Then, for each of a plurality of first sub-document groups, the second calculating unit 88 calculates the information volume of the documents classified into each of a plurality of second sub-clusters.

The expansion image control unit 90 controls the presentation of a cluster expansion image with the aim of expressing the information volume of the documents corresponding to each of a plurality of first sub-clusters and corresponding to each of a plurality of second sub-clusters. That is, for each of a plurality of first sub-document groups, the expansion image control unit 90 generates a cluster expansion image indicating the information volume of the documents classified into each of a plurality of second sub-clusters. Then, the expansion image control unit 90 outputs the generated cluster expansion image to the display device 12, and displays the cluster expansion image in the display device 12.

Figure 17:
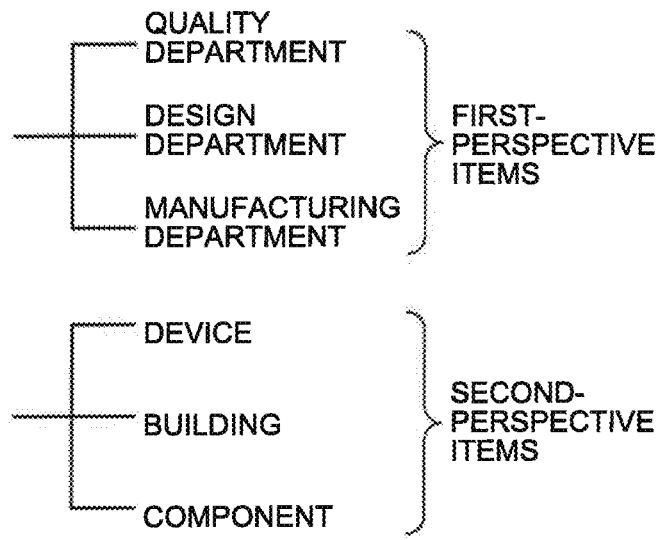
FIG. 17 is a diagram illustrating an example of a plurality of first-perspective items and a plurality of second-perspective items.

FIG. 17 is a diagram illustrating an example of a plurality of first-perspective items and a plurality of second-perspective items stored in the item storing unit 46. The item storing unit 46 stores therein a plurality of first-perspective items and a plurality of second-perspective items meant for classifying the document group according to different perspectives. A plurality of first-perspective items and a plurality of second-perspective items are, for example, set in advance by the user. The information processing device 20 obtains a plurality of first-perspective items and a plurality of second-perspective items from other devices. Moreover, the information processing device 20 can also obtain a plurality of first-perspective items and a plurality of second-perspective items input by the user.

A plurality of first-perspective items and a plurality of second-perspective items represent information meant for classifying the document group according to different perspectives. Thus, the information processing device 20 can narrow down the document group according to any one first perspective item, and then can further narrow down the document group according to any one second-perspective item.

Figure 18:
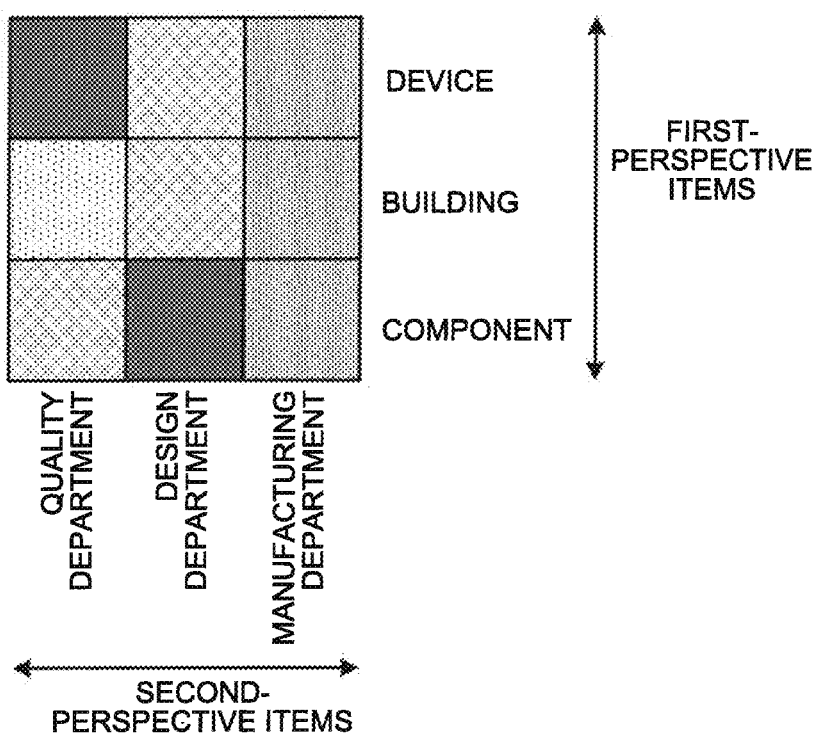
FIG. 18 is a diagram illustrating an exemplary item selection image.

FIG. 18 is a diagram illustrating an exemplary item selection image. The information processing device 20 generates an item selection image of the heat map type as illustrated in FIG. 18, for example.

The item selection image has a two-dimensional grid-like pattern in which one axis (a first-perspective axis) represents the first-perspective items and the other axis (a second-perspective axis) represents the second-perspective items. In the example illustrated in FIG. 18, the vertical axis represents the first-perspective axis and the horizontal axis represents the second-perspective axis. In the item selection image, the brightness or the concentration of each of a plurality of grids indicates the information volume of the documents classified according to the corresponding first-perspective item and the corresponding second-perspective item.

For example, in the item selection image illustrated in FIG. 18, the first-perspective axis indicates three first-perspective items, namely, "device", "building", and "component". Moreover, in the item selection image, the second-perspective axis indicates three second-perspective items, namely, "quality department", "design department", and "manufacturing department". Then, in the item selection image, the brightness or the concentration of the grid corresponding to the first-perspective item "device" and the second-perspective item "quality department" indicates the information volume of the documents classified into the first-perspective item "device" and the second-perspective item "quality department". The same is the case regarding the brightness or the concentration of the other grids.

Meanwhile, in an identical manner to the initial image explained in the first embodiment, the item selection image too is not limited to a heat map-like image as illustrated in FIG. 18. Moreover, in the item selection image displayed in the display device 12, the user can select, using the input device 14, any one first-perspective item from among a plurality of first-perspective items displayed along the first-perspective axis as well as select, at the same time, any one second-perspective item from among a plurality of second-perspective items displayed along the second-perspective axis.

Figure 19:
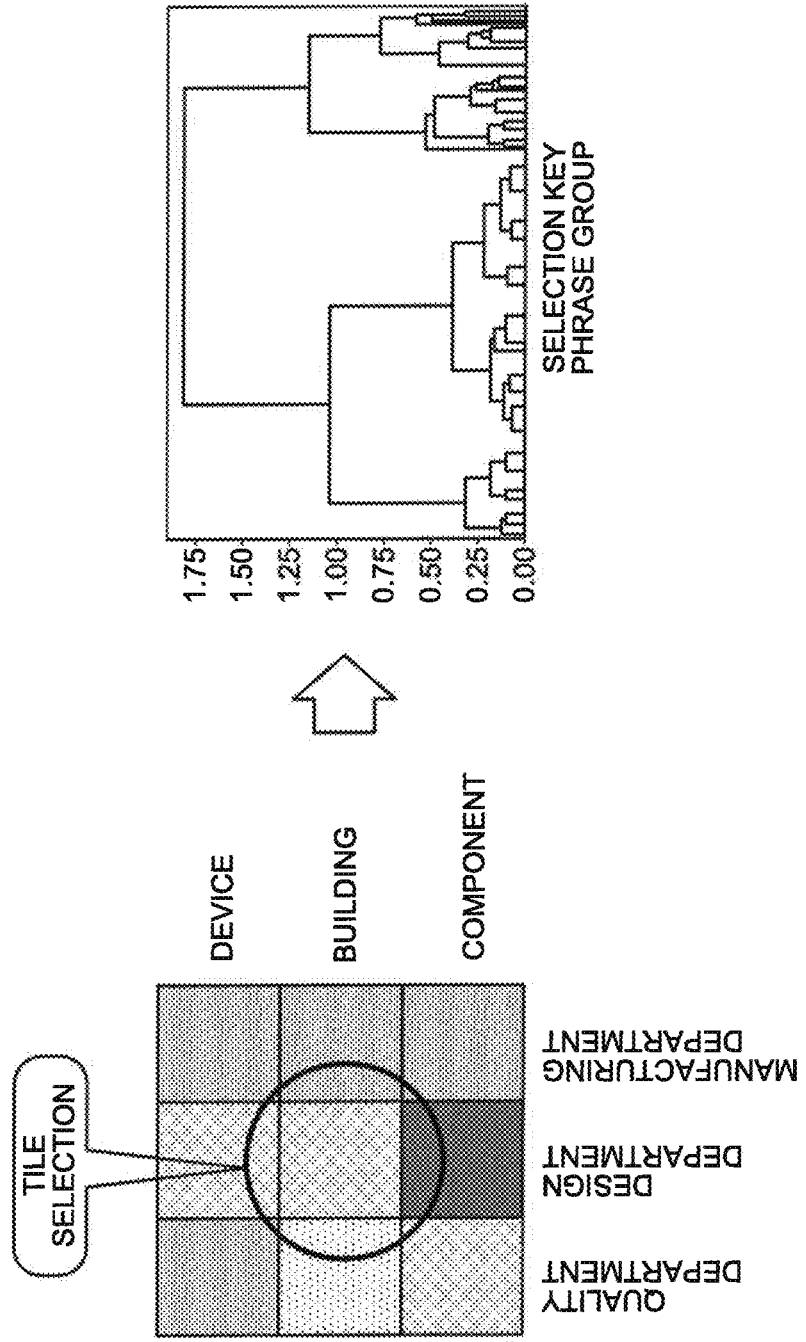
FIG. 19 is a diagram illustrating an exemplary dendrogram indicating a structure of a selection key phrase group.

FIG. 19 is a diagram illustrating an exemplary dendrogram indicating a structure of the item selection image and the selection key phrase group. After the item selection image is displayed, the information processing device 20 receives, from the input device 14, a selection operation performed by the user for selecting any one first-perspective item from among a plurality of first-perspective items and selecting any one second-perspective item from among a plurality of second-perspective items. For example, in the item selection image in which a plurality of two-dimensional grids is displayed, when a single grid (tile) is selected, the information processing device 20 receives a selection operation regarding the first-perspective item and the second-perspective item corresponding to that tile.

When a first-perspective item and a second-perspective item are selected, the information processing device 20 accesses the document storing unit 42 and extracts, from the document group, a selection document group including a plurality of documents classified into the selected first-perspective item and the selected second-perspective item. Moreover, the information processing device 20 obtains a selection key phrase group that includes a plurality of key phrases included in the selection document group extracted by the document extracting unit 94. Then, the information processing device 20 performs hierarchical clustering of the obtained selection key phrase group. For example, with respect to the selection key phrase group, the information processing device 20 performs hierarchical clustering as illustrated in the dendrogram in FIG. 19.

Figure 20:
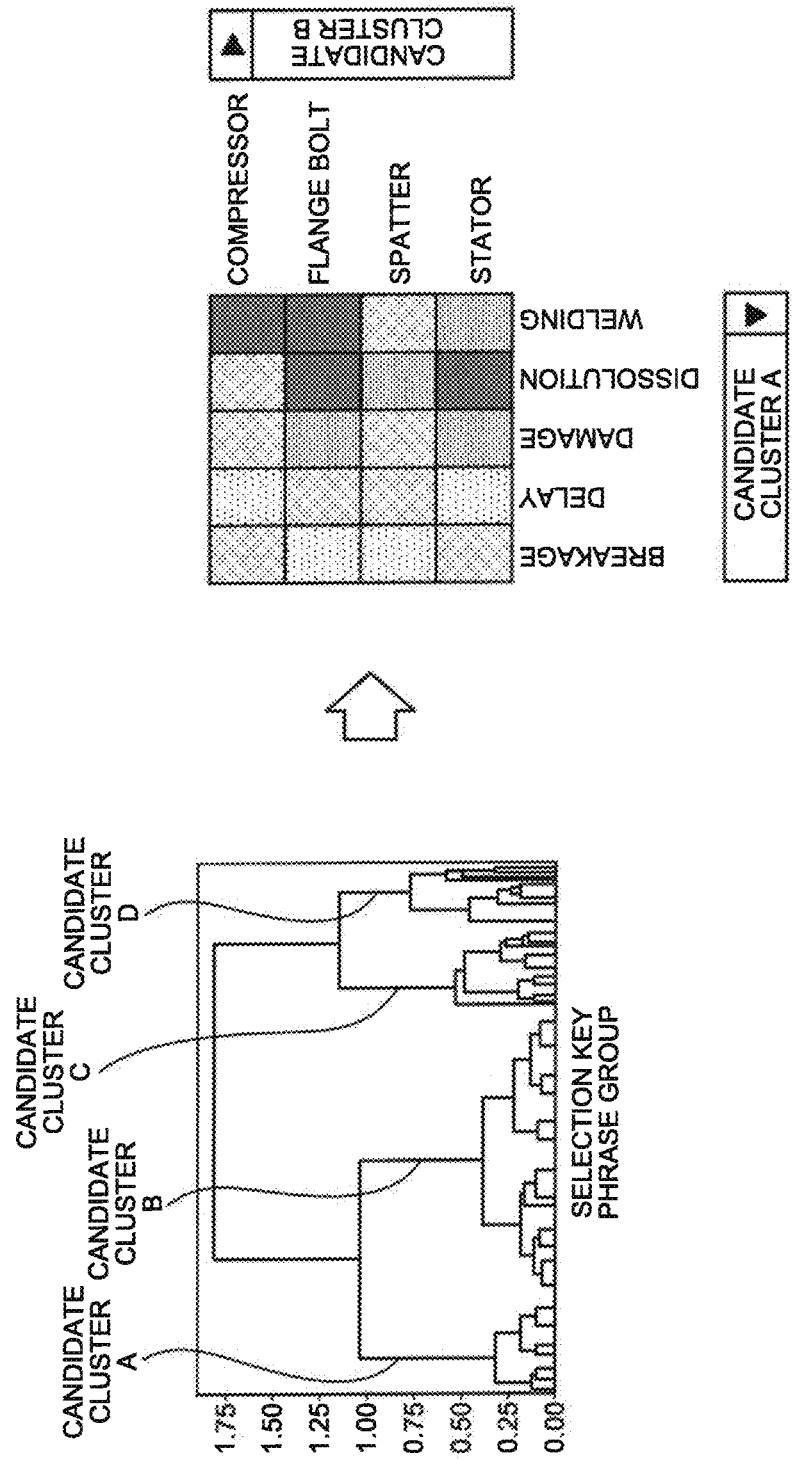
FIG. 20 is a diagram illustrating an exemplary dendrogram and an exemplary cluster expansion image.

FIG. 20 is a diagram illustrating an exemplary dendrogram that indicates a structure of the selection key phrase group and illustrating an exemplary cluster expansion image. For example, the information processing device 20 divides the clusters having the hierarchical structure as illustrated in the dendrogram in FIG. 20, and generates a plurality of candidate clusters. For example, the information processing device 20 divides the hierarchically-clustered selection key phrase group based on the dendrogram, and generates a predetermined number of (for example, a minimum of four) candidate clusters.

The information processing device 20 can assign a label to each of a plurality of candidate clusters. For example, the information processing device 20 can set, as the label of a candidate cluster, the key phrase close to the center position of that candidate cluster.

In the example illustrated in FIG. 20, the information processing device 20 generates four candidate clusters. More particularly, the information processing device 20 generates a candidate cluster having a label "A" assigned thereto, a candidate cluster having a label "B" assigned thereto, a candidate cluster having a label "C" assigned thereto, and a candidate cluster having a label "D" assigned thereto.

Then, for each of a plurality of candidate clusters obtained by division, the information processing device 20 calculates the score indicating the utility with respect to the selected first-perspective item and the selected second-perspective item. Subsequently, the information processing device 20 decides, as the first reference cluster, the candidate cluster having the score indicating the highest utility from among a plurality of candidate clusters, and decides, as the second reference cluster, the candidate cluster having the score indicating the second highest utility from among a plurality of candidate clusters. For example, in the example illustrated in FIG. 20, the candidate cluster having the label "B" assigned thereto is decided as the first reference cluster, and the candidate cluster having the label "A" assigned thereto is decided as the second reference cluster.

Subsequently, the information processing device 20 divides the first reference cluster into a plurality of first sub-clusters, and divides the second reference cluster into a plurality of second sub-clusters. Then, the information processing device 20 generates a cluster expansion image that indicates the information volume of the documents corresponding to each of a plurality of first sub-clusters and corresponding to each of a plurality of second sub-clusters.

The cluster expansion image has a two-dimensional grid-like pattern in which one axis represents the first sub-clusters and the other axis represents the second sub-clusters. In the example illustrated in FIG. 20, the vertical axis represents the first sub-clusters and the horizontal axis represents the second sub-clusters. In an identical manner to the initial image, in the cluster expansion image, the brightness or the concentration of each of a plurality of grids indicates the information volume of the documents classified according to the corresponding first sub-cluster and the corresponding second sub-cluster.

The vertical axis indicates-four first sub-clusters, namely, "compressor", "flange bolt", "spatter", and "stator". Moreover, in the cluster expansion image, the horizontal axis indicates five second sub-clusters, namely, "breakage", "delay", "damage", "dissolution", "and "welding".

Meanwhile, in an identical manner to the initial image, the cluster expansion image too is not limited to a heat map-like image. Moreover, in the cluster expansion image, the user can select, using the input device 14, any one first sub-cluster from among a plurality of first sub-clusters displayed along the vertical axis. In that case, the information processing device 20 displays, along the vertical axis, a plurality of clusters at further lower positions of the selected first sub-cluster. In an identical manner, in the cluster expansion image, the user can select, using the input device 14, any one second sub-cluster from among a plurality of second sub-clusters displayed along the horizontal axis. In that case, the information processing device 20 displays, along the horizontal axis, a plurality of clusters at further lower positions of the selected second sub-cluster.

Figure 21:
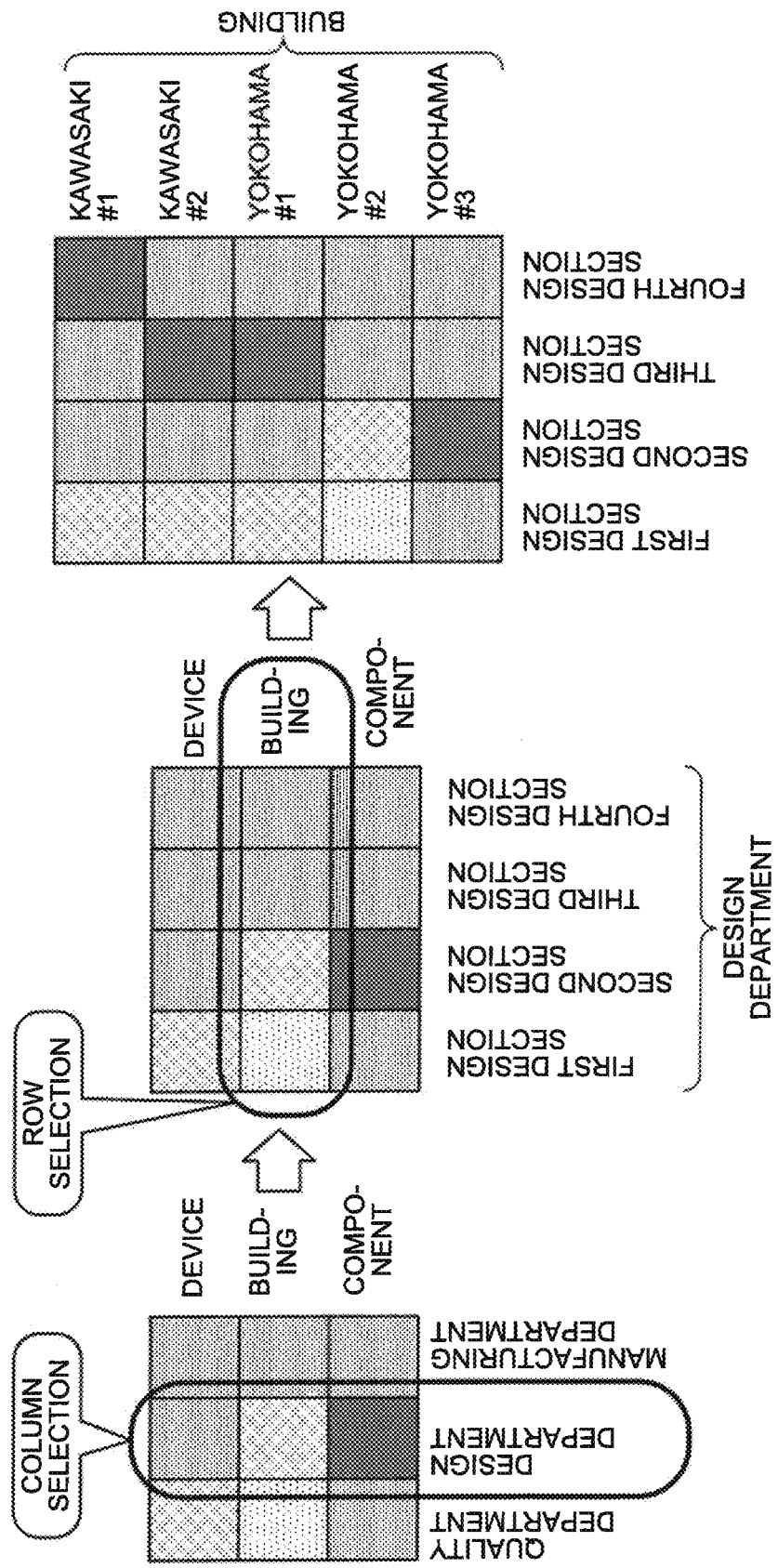
FIG. 21 is a diagram illustrating an item selection image in the case in which column selection and row selection are performed.

FIG. 21 is a diagram illustrating an item selection image in the case in which column selection and row selection are performed. A plurality of first-perspective items and a plurality of second-perspective items stored in the item storing unit 46 can have a hierarchical structure implemented in a tree structure.

In that case, the information processing device 20 can receive a selection operation performed by the user for selecting any one first-perspective item from among a plurality of first-perspective items on the first-perspective axis. Moreover, the information processing device 20 can receive a selection operation performed by the user for selecting any one second-perspective item from among a plurality of second-perspective items on the second-perspective axis.

For example, when any one column in the item selection image is selected by the user, the information processing device 20 determines that the second-perspective item corresponding to the selected column is selected. In that case, the information processing device 20 substitutes the items along the horizontal axis in the item selection image with a plurality of items expanded in the lower levels of the selected second-perspective item.

Moreover, for example, when any one row in the item selection image is selected by the user, the information processing device 20 determines that that the first-perspective item corresponding to the selected row is selected. In that case, the information processing device 20 substitutes the items along the vertical axis in the item selection image with a plurality of items expanded in the lower levels of the selected first-perspective item.

Effect of Second Embodiment

As described above, the information processing device 20 according to the second embodiment classifies a document group using two axes according to the search intention and the user interest, and provides the information volume. In this case, the information processing device 20 classifies the document group according to a plurality of predetermined first-perspective items and a plurality of predetermined second-perspective items, and displays an item selection image. Then, the information processing device 20 extracts, from the document group, a selection document group that includes a plurality of documents classified into the user-selected first-perspective item and the user-selected second-perspective item. Subsequently, the information processing device 20 performs clustering of the selection document group and generates a plurality of candidate clusters. Then, the information processing device 20 automatically decides on two candidate clusters that are useful for the selected first-perspective item and the selected second-perspective item. Subsequently, the information processing device 20 generates a cluster expansion image in which a plurality of first sub-clusters obtained by classifying one of the two decided candidate clusters is treated as one axis and in which a plurality of second sub-clusters obtained by classifying the other decided candidate cluster is treated as the other axis.

In this way, since the information processing device 20 classifies two axes using clustering, the document group can be classified at low cost. Moreover, since the information processing device 20 classifies the two axes into a plurality of sub-clusters useful for the selection document group, the document group can be appropriately classified. Hence, the information processing device 20 can present, at low cost, information obtained by appropriately classifying the document group.

Computer Program

A computer program executed in the information processing device 20 is recorded and provided as an installable file or an executable file in a computer-readable recording medium such as a compact disk read only memory (CD-ROM), a flexible disk (FD), a compact disk recordable (CD-R), or a digital versatile disk (DVD). Alternatively, the computer program executed in the information processing device 20 can be stored and provided in a downloadable manner in a computer connected to a network such as the Internet. Still alternatively, the computer program executed in the information processing device 20 can be provided or distributed via a network such as the Internet. Still alternatively, the computer program executed in the information processing device 20 can be stored in advance and provided in a read only memory (ROM).

The program executed in the information processing device 20 includes preprocessing modules (a document obtaining module, a key phrase generation module, a document registration module, a clustering module, a dividing module, an item obtaining module, and an item registration module); first image control modules (a start receiving module, a first calculating module, and an initial image control module); and second image control modules (an item selecting module, a score calculating module, a deciding module, a sub-cluster generating module, a sub-item extracting module, a second calculating module, and an expansion image control module). In the information processing device 20, a processor (the processing circuit 30) reads the computer program from a memory medium (the memory device 16) and executes it so that each module gets loaded in a main memory device (the memory circuit 24). As a result, the processor (the processing circuit 30) functions as the preprocessing unit 32 (the document obtaining unit 52, the key phrase generating unit 54, the document registering unit 56, the clustering unit 58, the dividing unit 60, the item obtaining unit 62, and the item registering unit 64); functions as the first image control unit 34 (the start receiving unit 72, the first calculating unit 74, and the initial image control unit 76); and functions as the second image control unit 36 (the item selecting unit 78, the score calculating unit 80, the deciding unit 82, the sub-cluster generating unit 84, the sub-item extracting unit 86, the second calculating unit 88, and the expansion image control unit 90). Meanwhile, some or all of these constituent elements can be alternatively implemented using some other hardware other than the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors configured to:
perform hierarchical clustering of a key phrase group which includes a plurality of key phrases included in a document group;
divide the key phrase group into a plurality of candidate clusters;
receive a selection operation of selecting any one item from among a plurality of predetermined items meant for classifying the document group;
for each of the plurality of candidate clusters, calculate a score indicating utility with respect to the selected item;
decide, as a reference cluster, a candidate cluster for which the score has a predetermined ranking from among the plurality of candidate clusters;
divide the reference cluster into a plurality of sub-clusters;
extract a plurality of predetermined sub-items in lower levels of the selected item; and
control presentation of an expansion image for expressing information volume of documents corresponding to each of the plurality of sub-items and corresponding to each of the plurality of sub-clusters.

2. The information processing device according to claim 1, wherein
in deciding, the processors decide, as the reference cluster, a single candidate cluster having a highest score from among the plurality of candidate clusters.

3. The information processing device according to claim 1, wherein the score indicates the information volume of documents classified into the selected item in concerned candidate cluster.

4. The information processing device according to claim 1, wherein the score indicates dispersion of the information volume of documents corresponding to each of the plurality of sub-items and corresponding to each of a plurality of sub-clusters obtained by dividing concerned candidate cluster.

5. The information processing device according to claim 1, wherein the score indicates frequency or ratio of past selection of concerned candidate cluster performed by user's operations.

6. The information processing device according to claim 1, wherein
in calculating, the processors calculate the score by adding a first parameter, a second parameter, and a third parameter,
the first parameter indicates a value corresponding to the information volume of documents classified into the selected item in concerned candidate cluster,
the second parameter indicates a value corresponding to dispersion of the information volume of documents corresponding to each of the plurality of sub-items and corresponding to each of a plurality of sub-clusters obtained by dividing concerned candidate cluster, and
the third parameter indicates a value corresponding to frequency or ratio of past selection of concerned candidate cluster performed by user's operations.

7. The information processing device according to claim 1, wherein
the processors is further configured to control presentation of an initial image with aim of expressing the information volume of documents corresponding to each of the plurality of items and corresponding to each of the plurality of candidate clusters.

8. The information processing device according to claim 1, wherein, when any one sub-item is selected from among the plurality of sub-items,
in calculating, in deciding, in extracting and in controlling, the processors
substitute the plurality of sub-items with the plurality of items,
substitute the plurality of sub-clusters with the plurality of candidate clusters,
again perform operations, and
present an expansion image.

9. The information processing device according to claim 1, wherein
along with controlling presentation of the expansion image, in controlling, the processors control presentation of a menu image that enables selection of any one of the plurality of candidate clusters, and
when a new candidate cluster is selected from the menu image,
in dividing, the processors treat the new candidate cluster as the reference cluster and divide the reference cluster into a plurality of new sub-clusters, and
in controlling, the processors control presentation of a new expansion image for expressing information volume of documents corresponding to each of the plurality of sub-items and corresponding to each of a plurality of new sub-clusters.

10. The information processing device according to claim 1, wherein
in receiving, the processors receive a selection operation
for selecting any one first-perspective item from among a plurality of predetermined first-perspective items meant for classifying the document group, and
for selecting any one second-perspective item from among a plurality of predetermined second-perspective items meant for classifying the document group,
the processors is further configured to extract, from the document group, a selection document group which includes a plurality of documents classified into the selected first-perspective item and the selected second-perspective item,
the processors is further configured to perform hierarchical clustering of a selection key phrase group which includes a plurality of key phrases included in the selection document group,
the processors is further configured to divide the selection key phrase group into a plurality of candidate clusters,
in calculating, the processors calculate, for each of the plurality of candidate clusters, the score indicating utility with respect to the selected first-perspective item and the selected second-perspective item,
in deciding, the processors decide, as a first reference cluster and a second reference cluster, two candidate clusters for which the scores have predetermined rankings from among the plurality of candidate clusters,
in dividing, the processors divide the first reference cluster into a plurality of first sub-clusters and divide the second reference cluster into a plurality of second sub-clusters, and
in controlling, the processors control presentation of a cluster expansion image for expressing the information volume of documents corresponding to each of the plurality of first sub-clusters and corresponding to each of the plurality of second sub-clusters.

11. The information processing device according to claim 10, wherein the processors is further configured to control presentation of an item selection image for expressing the information volume of documents corresponding to each of the plurality of first-perspective items and corresponding to each of the plurality of second-perspective items.

12. An information processing method implemented by an information processing device, comprising:

performing, by a clustering unit, hierarchical clustering of a key phrase group which includes a plurality of key phrases included in a document group;

dividing, by a dividing unit, the key phrase group into a plurality of candidate clusters;

receiving, by an item selecting unit, a selection operation of selecting any one item from among a plurality of predetermined items meant for classifying the document group;

calculating, by a score calculating unit, for each of the plurality of candidate clusters, a score indicating utility with respect to the selected item;

deciding, by a deciding unit, as a reference cluster, a candidate cluster for which the score has a predetermined ranking from among the plurality of candidate clusters;

dividing, by a sub-cluster generating unit, the reference cluster into a plurality of sub-clusters;

extracting, by a sub-item extracting unit, a plurality of predetermined sub-items in lower levels of the selected item; and controlling, by an expansion image control unit, presentation of an expansion image with aim of expressing information volume of documents corresponding to each of the plurality of sub-items and corresponding to each of the plurality of sub-clusters.

13. A computer program product having a non-transistory computer readable medium including programmed instructions, wherein the instructions, when executed by an information processing device, cause the information processing device to implement an information processing method comprising:

performing, by a clustering unit, hierarchical clustering of a key phrase group which includes a plurality of key phrases included in a document group;

dividing, by a dividing unit, the key phrase group into a plurality of candidate clusters;

receiving, by an item selecting unit, a selection operation of selecting any one item from among a plurality of predetermined items meant for classifying the document group;

calculating, by a score calculating unit, for each of the plurality of candidate clusters, a score indicating utility with respect to the selected item;

deciding, by a deciding unit, as a reference cluster, a candidate cluster for which the score has a predetermined ranking from among the plurality of candidate clusters;

dividing, by a sub-cluster generating unit, the reference cluster into a plurality of sub-clusters;

extracting, by a sub-item extracting unit, a plurality of predetermined sub-items in lower levels of the selected item; and controlling, by an expansion image control unit, presentation of an expansion image for expressing information volume of documents corresponding to each of the plurality of sub-items and corresponding to each of the plurality of sub-clusters.

* * * * *